(12) United States Patent
Vuillermet et al.

(10) Patent No.: US 10,782,152 B2
(45) Date of Patent: Sep. 22, 2020

(54) MAGNETIC FIELD SENSORS AND METHOD FOR DETERMINING POSITION AND ORIENTATION OF A MAGNET

(71) Applicant: Allegro MicroSystems, LLC, Manchester, NH (US)

(72) Inventors: Yannick Vuillermet, Voglans (FR); Andrea Foletto, Annecy le Vieux (FR); Andreas P. Friedrich, Metz-Tessy (FR)

(73) Assignee: Allegro MicroSystems, LLC, Manchester, NH (US)

( * ) Notice: Subject to any disclaimer, the term of this patent is extended or adjusted under 35 U.S.C. 154(b) by 236 days.

(21) Appl. No.: 15/678,369

(22) Filed: Aug. 16, 2017

(65) Prior Publication Data

US 2019/0056241 A1 Feb. 21, 2019

(51) Int. Cl.
  *G01C 9/00* (2006.01)
  *G01D 5/14* (2006.01)
  *G01D 5/165* (2006.01)

(52) U.S. Cl.
  CPC ............. *G01D 5/145* (2013.01); *G01D 5/165* (2013.01)

(58) Field of Classification Search
  CPC .............................. G01D 5/145; G01D 5/165
  USPC ......................................................... 702/151
  See application file for complete search history.

(56) References Cited

U.S. PATENT DOCUMENTS

| | | | | |
|---|---|---|---|---|
| 5,879,297 A | * | 3/1999 | Haynor | A61B 5/06 128/899 |
| 2006/0041398 A1 | * | 2/2006 | Alexander, Jr. | G01D 5/145 702/150 |
| 2013/0154622 A1 | * | 6/2013 | Zhou | G01D 5/145 324/207.12 |

(Continued)

FOREIGN PATENT DOCUMENTS

JP          10284323       * 10/1998
WO    WO 2011045540         4/2011

OTHER PUBLICATIONS

Melexis Microelectronic Integrated Systems "MLX90363 Triaxis® Magnetometer IC with High Speed Serial Interface"; 3901090363 Rev. 005 Data Sheet Jul. 2013; 57 pages.

(Continued)

*Primary Examiner* — Michael P Nghiem
(74) *Attorney, Agent, or Firm* — Daly, Crowley, Mofford & Durkee, LLP

(57) ABSTRACT

A magnetic field sensor for determining a position of a magnet, the position identified by one or more position variables can include: one or more magnetic field sensing element operable to generate one or more magnetic field measurements of the magnet and an associated one or more measured magnetic field variable values; a first module for identifying calculated magnetic field variable values associated with a plurality of positions of the magnet; a second module operable to perform an optimization process to determine a value of a distance function, the distance function using the one or more measured magnetic field (Continued)

variable values and the calculated magnetic field variable values; and a third module operable to determine the position of the magnet by associating the value of the distance function with corresponding values of the one or more position variables. A complimentary method can be used in the magnetic field sensor.

11 Claims, 12 Drawing Sheets

(56) References Cited

U.S. PATENT DOCUMENTS

| | | | |
|---|---|---|---|
| 2014/0243750 A1* | 8/2014 | Larsen | A61M 5/1452 604/189 |
| 2015/0377648 A1* | 12/2015 | Sirohiwala | G01D 5/145 324/207.2 |
| 2017/0038440 A1* | 2/2017 | Verfaeke | G01R 33/10 |
| 2017/0146366 A1* | 5/2017 | Metivier | G01D 5/145 |
| 2017/0268903 A1* | 9/2017 | Kranz | G01B 7/003 |

OTHER PUBLICATIONS

AS5171 "High-Resolution On-Axis Magnetic Angular Position Sensor"; ams Datasheet [v1-03] Jun. 23, 2016; 43 pages.

* cited by examiner

"Brute Force"

"Limited Range"

MAGNETIC FIELD SENSORS AND METHOD FOR DETERMINING POSITION AND ORIENTATION OF A MAGNET

CROSS REFERENCE TO RELATED APPLICATIONS

Not applicable.

STATEMENT REGARDING FEDERALLY SPONSORED RESEARCH

Not Applicable.

FIELD OF THE INVENTION

This invention relates generally to magnetic field sensors and methods used in magnetic field sensors and, more particularly, to magnetic field sensors and methods used in magnetic field sensors that can identify a position of a magnet in space.

BACKGROUND

Magnetic field sensors employ a variety of types of magnetic field sensing elements, for example, Hall effect elements and magnetoresistance elements, often coupled to a variety of electronics, all disposed over a common substrate. A magnetic field sensing element (and a magnetic field sensor) can be characterized by a variety of performance characteristics, one of which is a sensitivity, which can be expressed in terms of an output signal amplitude versus a magnetic field to which the magnetic field sensing element is exposed.

Some magnetic field sensors can detect a linear motion of a target object. Some other magnetic field sensors can detect a rotation of a target object.

SUMMARY

It is appreciated herein that there are many applications where the geometry and magnetization of a magnet may be known but the magnet's position and/or orientation may be unknown. Non-limiting examples of such applications include: (1) "slide-by" applications, where a sensed magnet undergoes 1-dimensional (1D) linear movement; (2) "all gear" applications where a sensed magnet undergoes 2-dimensional (2D) movement; and (3) end-of-shaft or side-shaft angle sensing applications where a magnet undergoes a rotation. More generally, the sensed magnet can undergo movement with one, two, three, four, five, or six degrees of freedom.

Described herein are systems and methods to determine the position/orientation of a magnet using actual measurements taken of a magnetic field resulting from the magnet, calculated (i.e., predicted) measurements of the magnetic field based on a mathematical model of the magnet, and a technique that seeks to minimize a numerical distance between the actual and calculated magnetic field measurements. In some embodiments, the magnet position/orientation is determined by finding a global minimum of a distance function that calculates a distance between actual and calculated magnetic field measurements. In some embodiments, the distance function calculates a mathematical norm between the actual and calculated measurements. In certain embodiments, a steepest descent technique may be used to determine values of position/orientation that reduce the distance function. In some embodiments, techniques may be used to avoid becoming "stuck" in a local minimum when seeking to minimize the distance function.

In many embodiments, position/orientation can be determined for a magnet having an arbitrary geometry and/or arbitrary magnetization direction and distribution. In some embodiments, position/orientation can be determined for multiple magnets, each of which may move independently from the others.

In particular embodiments, actual magnetic field measurements may be taken as absolute field measurements. In other embodiments, actual magnetic field measurements be taken as differential field measurements (e.g., in applications where external field perturbation immunity is required). In some embodiments, actual magnetic field measurements may be taken as magnetic field angle measurements. In some embodiments, actual magnetic field measurements may be taken using one or more magnetic field sensing elements provided as Hall effect elements (vertical or planar) or magnetoresistance elements.

In some embodiments, multiple magnetic field sensing elements may be used to allow for unicity of the determined magnet position/orientation. The magnetic field sensing elements may be oriented along multiple directions. Location and position of the magnetic field sensing elements may be selected based on upon the application. Multiple measurements may be taken from the magnetic field sensing elements.

In accordance with an example useful for understanding an aspect of the present invention, a method of determining a position of a magnet, the position identified by one or more position variables, the includes: generating one or more magnetic field measurements of the magnet and an associated one or more measured magnetic field variable values using one or more magnetic field sensing elements; identifying calculated magnetic field variable values associated with a plurality of positions of the magnet; performing an optimization process to determine a value of a distance function, the distance function using the one or more measured magnetic field variable values and the calculated magnetic field variable values; and determining the position of the magnet by associating the value of the distance function with corresponding values of the one or more position variables.

In accordance with another example useful for understanding another aspect of the present invention, a magnetic field sensor for determining a position of a magnet, the position identified by one or more position variables, the magnetic field sensor includes: a first module for identifying calculated magnetic field variable values associated with a plurality of positions of the magnet; a second module operable to perform an optimization process to determine a value of a distance function, the distance function using the one or more measured magnetic field variable values and the calculated magnetic field variable values; and a third module operable to determine the position of the magnet by associating the value of the distance function with corresponding values of the one or more position variables.

In accordance with another example useful for understanding another aspect of the present invention, a magnetic field sensor for determining a position of a magnet, the position identified by one or more position variables, the magnetic field sensor includes: means for generating one or more magnetic field measurements of the magnet and an associated one or more measured magnetic field variable values using one or more magnetic field sensing elements; means for identifying calculated magnetic field variable values associated with a plurality of positions of the magnet; means for performing an optimization process to determine a value of a distance function, the distance function using the one or more measured magnetic field variable values and the calculated magnetic field variable values; and means for determining the position of the magnet by associating the value of the distance function with corresponding values of the one or more position variables.

BRIEF DESCRIPTION OF THE DRAWINGS

The foregoing features may be more fully understood from the following description of the drawings in which.

Figure 1:
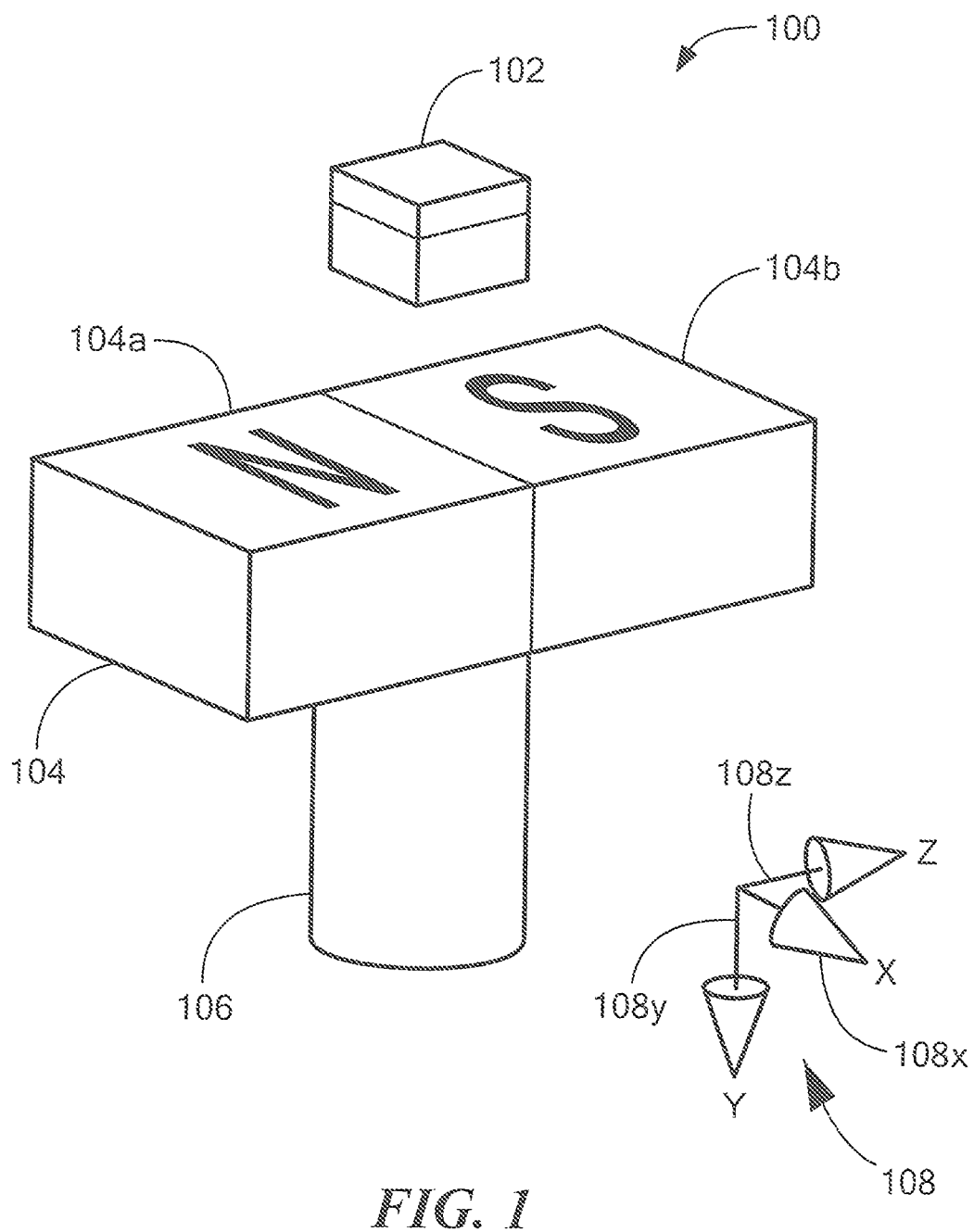
FIG. 1 is an isometric view of an illustrative system having a magnetic field sensor proximate to a magnet, in accordance with an end of shaft embodiment, with magnet movement along one axis and rotation about one axis.

The drawings are not necessarily to scale, or inclusive of all elements of a system, emphasis instead generally being placed upon illustrating the concepts, structures, and techniques sought to be protected herein.

DETAILED DESCRIPTION

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. There are different types of Hall effect elements, for example, a planar Hall element, a vertical Hall element, and a Circular Vertical Hall (CVH) element. There are also different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element might be a single element or, alternatively, might include two or more magnetic field sensing elements arranged in various configurations, e.g., a half bridge or full (Wheatstone) bridge. Depending on the device type and other application requirements, the magnetic field sensing element might be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

Some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back bias or other magnet, and a magnetic field sensor that senses a magnetic field density of a magnetic field.

As used herein below, the term "magnet" is used to describe a mechanical structure having permanent magnetism, relative movement of which is sensed by a magnetic field sensor. Thus, either the magnet or the magnetic field sensor, or both, can move relative to each other. However, discussion below refers only to magnet position.

As used herein, the terms "position" and "location" of a magnet refer to a quantified geometric state of the magnet described along one, two, or three axes and/or described as rotations about the one, two, or three axes. Thus, the terms "position" and "location" of a magnet refer to a quantified geometric state of the magnet described with up to six degrees of freedom. The up to six degrees of freedom are described as "position variables" (e.g., a six dimension position variable vector) herein. The position variables can have values, described herein as values of "position variable values" or "values of position variables." The position variable values can be stationary or can change with time. There can be any number of position variable values, for any number of positions of the magnet at the point (or points) in space.

Similarly, magnetic fields of a magnet at a point in space can be described by "magnetic field variables" (e.g., a three dimension magnetic field vector). The magnetic field variables can have values, described herein as values of "magnetic field variable values" or "values of magnetic field variables." The magnetic field variable values can be stationary or to can change with time. There can be any number of magnetic field variable values of the magnetic field variables, for any number of positions of the magnet at the point (or points) in space.

In some particular analyses described below, and where indicated, the term "position" is limited to refer to a quantified geometric state of the magnet described along one, two, or three axes. Where indicated, the term "orientation" refers to rotations about the one, two, or three axes. However, in most instances herein the term "position" refers to one or more of the above six states of the magnet.

While the position variables are described herein with up to six degrees of freedom, or dimensions (e.g., six vector elements), it will be understood that other coordinate systems with six or with other numbers of position variables can be used to describe a position or location. The other position variables can be mapped to the six dimensions, or not, and the same concepts as those described herein still apply.

While the magnetic field variables are described herein with up to three dimensions (e.g., three vector elements), it will be understood that other coordinate systems with three or with other numbers of magnetic field variables can be used to describe a magnetic field at a position. The other magnetic field variables can be mapped to the three dimensions, or not, and the same concepts as those described herein still apply.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital.

As used herein, the term "module" is used to describe a "processor."

A processor can contain internal processors or internal modules that perform portions of the function, operation, or sequence of operations of the processor. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures, but should be understood.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

Figure 6:
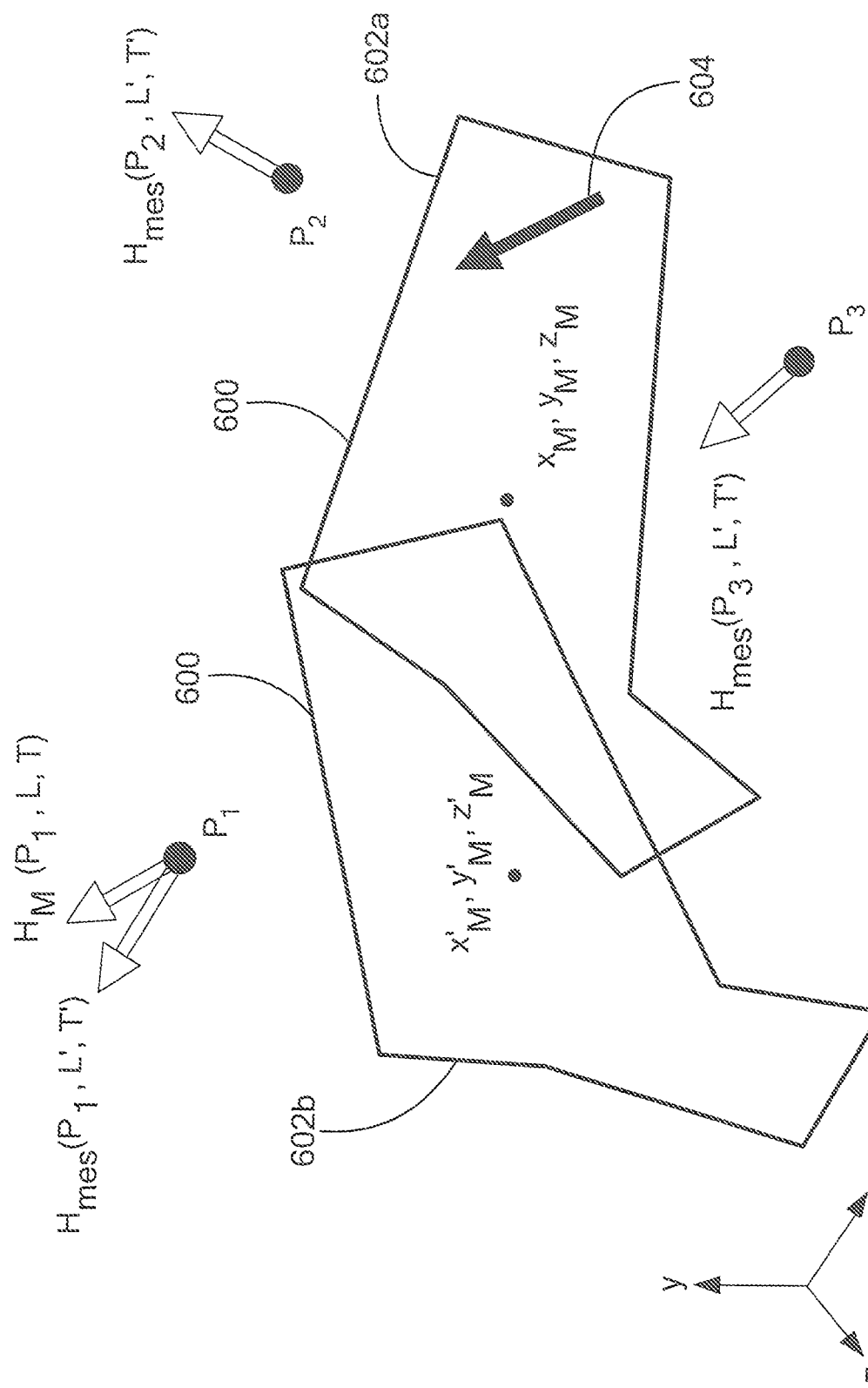
FIG. 6 is a block diagram showing an illustrative generalized magnet with an arbitrary shape.

First, referring ahead to generalized FIG. 6, a magnet 600 is shown at two physical positions 602a, 602b. The magnet 600 has an arbitrary shape and has a direction of magnetization described by an arrow 604. This magnet 600 is in space at a position $L=(x_M, y_M, z_M)$ and with an orientation $T=(\alpha, \beta, \gamma)$, where $(\alpha, \beta, \gamma)$ are angles around (X,Y,Z) axis. It will be understood that $x_M$, $y_M$, $z_M$, $\alpha$, $\beta$, $\gamma$ describe six degrees of freedom of the position of the magnet 600. In equations above and below, the terms L and T are together described as position variables.

A function, $f_{M,P}$, can describe magnetic field values in three dimensions (x,y,z) based upon a calculation of magnetic field created by this magnet 600, M, at any points $P_i$ in space around the magnet 600, for all magnet positions/orientations (L,T). P is a matrix that contains the coordinates of all the Pi points, i.e., in three axes, x, y, and z. The matrix containing these calculated magnetic fields (calculated by a mathematical model) can be called $H_M(P,L,T)$.

$$P = \begin{pmatrix} x_1 & x_2 & \ldots \\ y_1 & y_2 & \ldots \\ z_1 & z_2 & \ldots \end{pmatrix} \quad (1)$$

$$f_{M,P}(L, T) = H_M(P, L, T) \quad (2)$$

$$H_M(P, L, T) = \begin{pmatrix} Hx_1 & Hx_2 & \ldots \\ Hy_1 & Hy_2 & \ldots \\ Hz_1 & Hz_2 & \ldots \end{pmatrix} \quad (3)$$

Thus, it should be understood that, for each point in space of the magnet, the function $f_{M,P}$ (i.e., $H_M(P, L, T)$) uses up to six position variable values to describe the position of the magnet at the point in space, and a related three calculated magnetic field variable values indicative of a calculated (or predicted) magnetic field at the point, P, in space. There can be a direct relation between the calculated magnetic field values and the calculated position variable values (position of the magnet).

In contrast, magnetic field measurements $H_{mes}(P,L',T')$ can be generated in three dimensions, (x,y,z), for example, using magnetic field sensing elements, at all the points P around the magnet 600, M, at magnet position $L'=(x'_M, y'_M, z'_M)$ and orientation $T'(\alpha', \beta', \gamma')$.

Thus, it should be understood that, for each point in space of the magnet, the function $H_{mes}(P,L',T')$ uses up to six position variable values to describe the position of the magnet at the point in space, and a related three measured magnetic field variable values indicative of a measured magnetic field at the point, P, in space. It will also be understood from discussion below, that the magnetic field measurement values can be directly obtained from a magnetic field sensor.

Position and orientation L' and T' of the magnet 600, M, can be determined based on the three dimensional measured magnetic field variable values $H_{mes}(P,L',T')$, e.g., measurement made by a magnetic field sensor, and upon the three dimensional calculated magnetic field variable values $H_m(P, L, T)$.

To this end a distance function, $d_{M,P}$, can be used that contains values of numerical distances between the three dimensional magnetic field measurements at position/orientation (L',T') and the three dimensional magnetic field predicted by function $f_{M,P}$ by the above magnet model at position/orientation (L,T).

$$d_{M,P}(L,T) = \|f_{M,P}(L,T) - H_{mes}(P,L',T')\| \quad (4)$$

The $\| \|$ symbol stands for the Euclidean norm (or 2-norm) of a matrix. In some embodiments, other norms can be used (1-norm or p-norm, for example).

This function depends on the magnet M position and orientation (but also magnet dimensions, magnetization and material). The magnet 600 can be a moving object and the general movement can be known in advance by the system, at least its nominal movement characteristics.

Evaluation of the function $d_{M,P}$ indicates how close is an up to three dimension measured magnetic field to an up to three dimension calculated (or predicted) magnetic field. Evaluated points on the distance function are associated with up to six measured position variable values (i.e., position of the magnet). Thus, evaluation of the function $d_{M,P}$ ultimately indicates how close are the current evaluated (i.e., calculated) magnet position and orientation (L,T) to the real position and orientation of the magnet (L',T'). Ideally, if there is unicity of the solution, then $d_{M,P}$ (L,T)=0 implies that the magnet position is perfectly known.

In view of the above, a prediction of position and orientation of the magnet M can be determined by minimizing the function $d_{M,P}$, a minimum distance between measured and calculated magnetic such that the currently evaluated magnet position (Le, Te) is close to the real (actual) magnet position (L', T'). The distance function is further explained in conjunction with FIG. 7.

Note that $(L_e, T_e)$ is usually different from the real magnet position (L',T') because the measurements and the magnetic model of the system may not be perfect.

As used herein, the term "model" as used above refers to a mathematical function that takes, as input, an arbitrary magnet position and calculates, as output, a "calculated" magnetic field that would be sensed by one or more magnetic field sensing elements if the magnet were to assume that position. The arbitrary magnet position may be represented as one or more variables, e.g., mounting distance y and angle of rotation β in an end-of-shaft application described below in conjunction with FIGS. 1A and 1B. Thus, a magnet model may be generated using knowledge of the magnet's geometry and magnetic characteristics (e.g., magnetization direction and distribution), in addition to known positions and characteristics of the magnetic field sensing element(s) relative to the magnet. A magnet model may be generated inductively (e.g., using Maxwell equations or derivations thereof) or experimentally (e.g., by placing the magnet into many different known positions and obtaining measurements from the magnetic field sensing elements).

It will be appreciated that, from Maxwell equations and in the most general case, the field H generated by a magnetized material is given by an equation:

$$H(P) = -\frac{1}{4\pi} grad \int\int\int_V M(N) \cdot \frac{r-r'}{|r-r'|^3} dV \quad (5)$$

where P is the position where the field is computed, grad is the gradient operator, M(N) is the magnetization vector at a given point N in the magnetized material, r is the vector from the origin to P, and r' is the vector from the origin to N and dV is the differential volume. Note that H is expressed in A/m, Amperes per meter.

This equation cannot be directly computed, even in the case of very simple magnet geometry. Thus, it is necessary to mesh the magnet geometry into k volume elements. It is also necessary to assume that each element of this mesh will carry a uniform magnetization.

These two assumptions lead to the simplified equation:

$$H(P) = \frac{1}{4\pi}\sum_{j=1}^{k} \int\int_{Sj} Mj \cdot nj \cdot \frac{r-rj}{|r-rj|^3} dS \quad (6)$$

where Sj is the surface of the mesh element j, nj is the normal vector of surface Sj, rj is the barycenter of element j, and Mj is the uniform magnetization vector of element j. From this equation, magnet models may be generated based on arbitrary magnet dimensions, magnetization, and position/orientation. H(P) can indicate up to three magnetic field variables (e.g., in x, y, z directions, i.e., up to three magnetic field variables) associated with position variable values (e.g., with up to six position variables).

Figure 7:
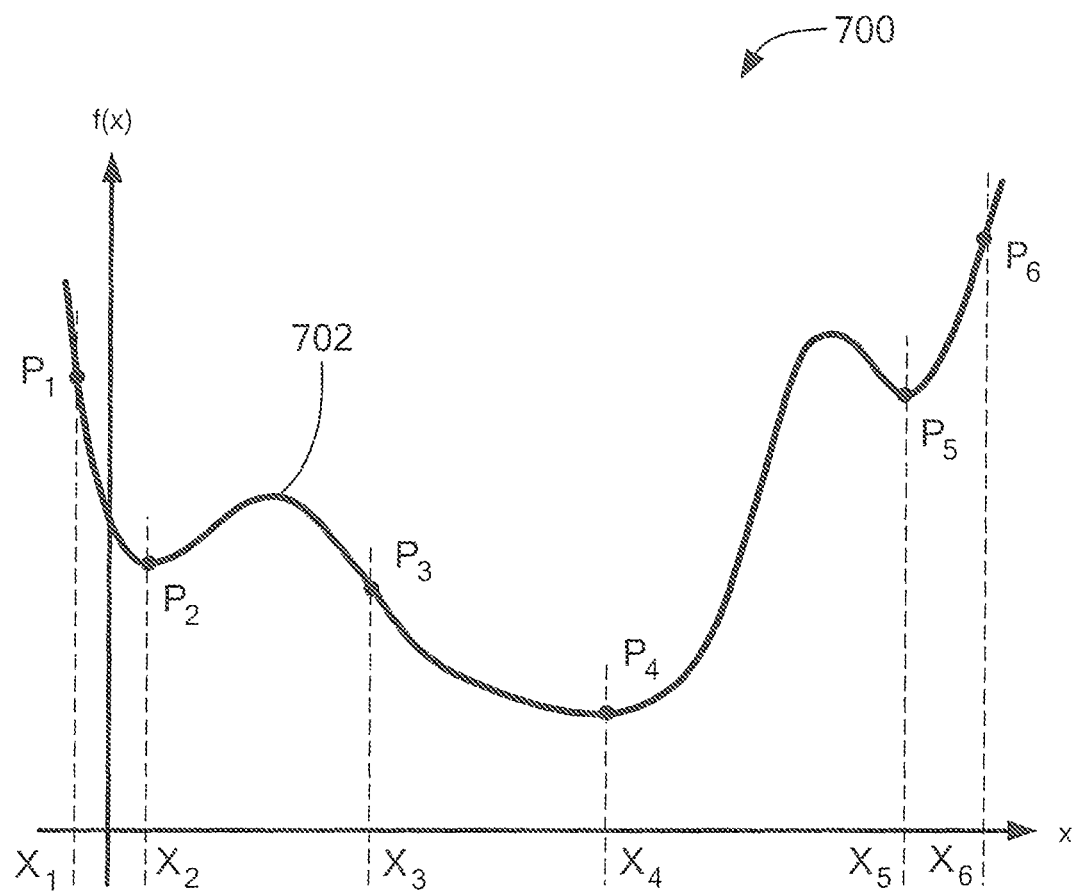
FIG. 7 is a graph showing an illustrative distance function.

Now referring ahead to FIG. 7, a graph 700 includes a vertical axis with a scale in units of numerical distance between calculated and measured magnetic fields along an X-axis (scalar values) in arbitrary units of magnetic field and a horizontal axis with a scale describing position of a magnet along the X-axis in arbitrary units A curve 702 is indicative of an illustrative distance function described above in conjunction with equation 4, but here the distance function is a function of only one of the position variables (of up to six position variables) in the dimension X and only one of the magnetic field variables (of up to three magnetic field variables) in the dimension X. Points on the curve 702 are indicative of evaluations of the distance function at different values of the one position variable in the dimension X.

The distance function has local minima P2 and P5 at horizontal axis values x2 and x5 and a global minimum P4 at horizontal axis value x4. It may not be desirable to identify the local minima P2 and P5 at x2 and x5. Instead, it may be desirable to determine the value of the position of the magnet only at the global minimum at x4 of the distance function 702. The position x4 at the global minimum P4 of the distance function 702 can be indicative of the best estimate of the magnet position along the X-axis.

Figure 4:
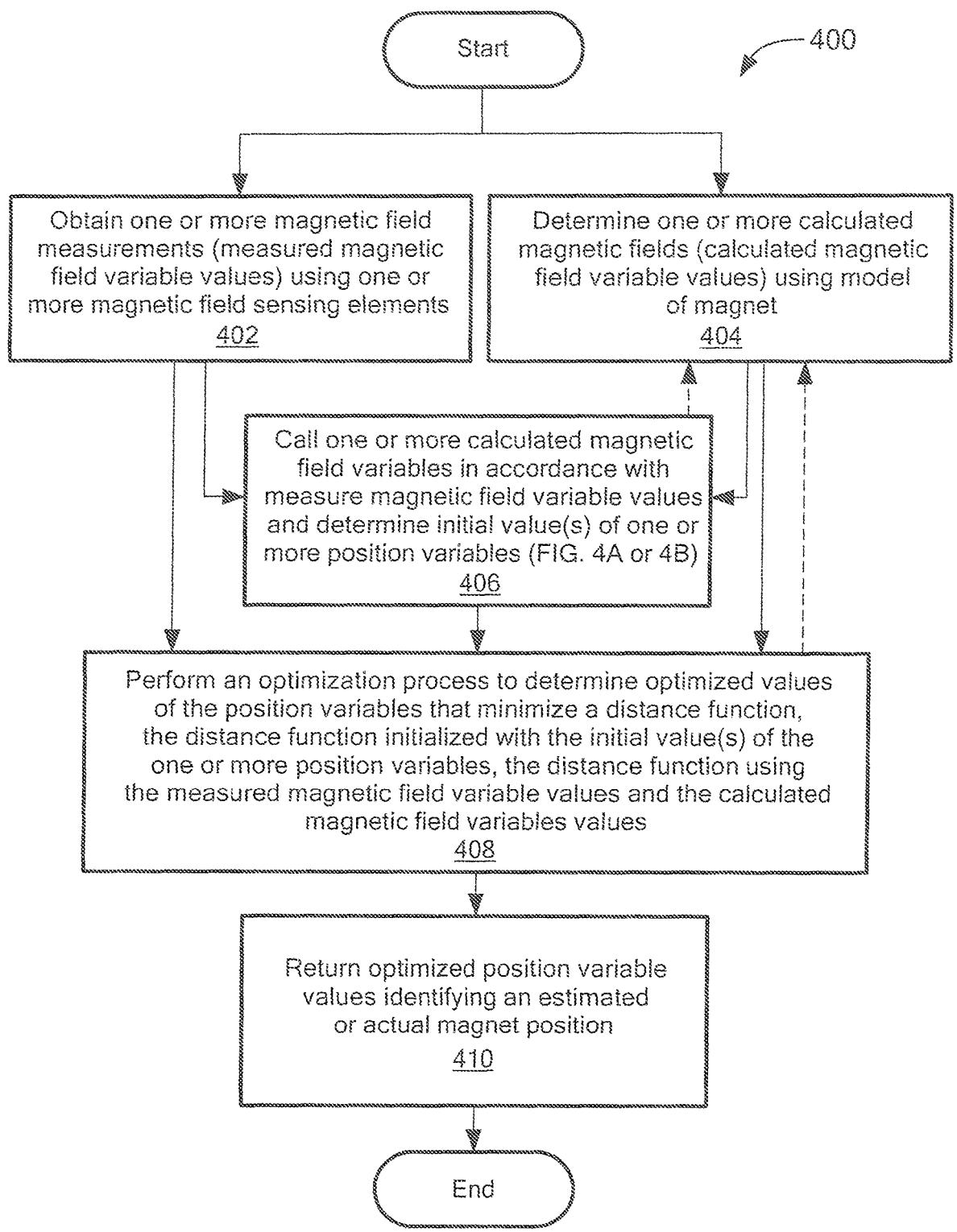
FIGS. 4, 4A, 4B, and 5 are flow diagrams illustrating processing that may occur within a magnetic field sensor, in accordance with some embodiments.
Figure 4A:
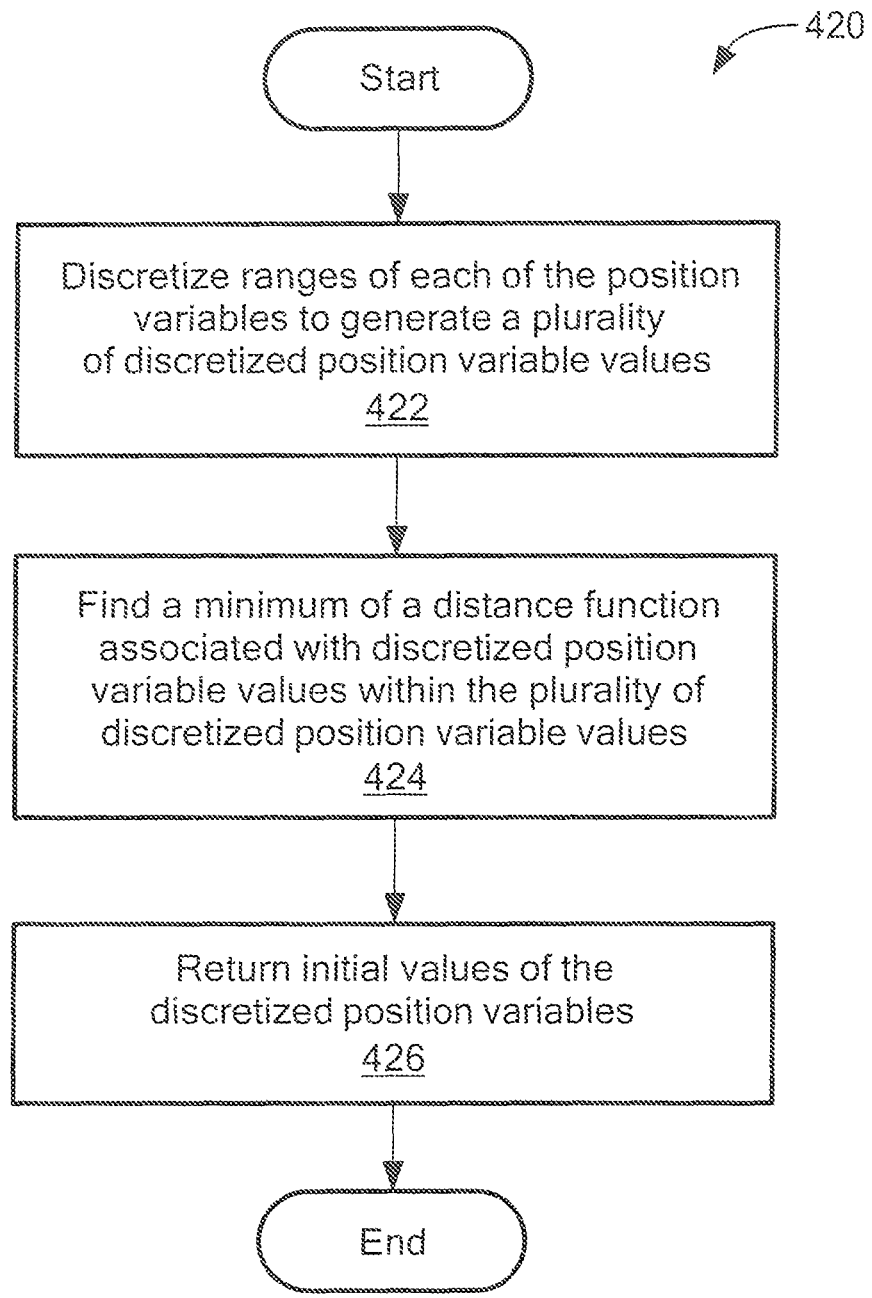
Figure 4B:
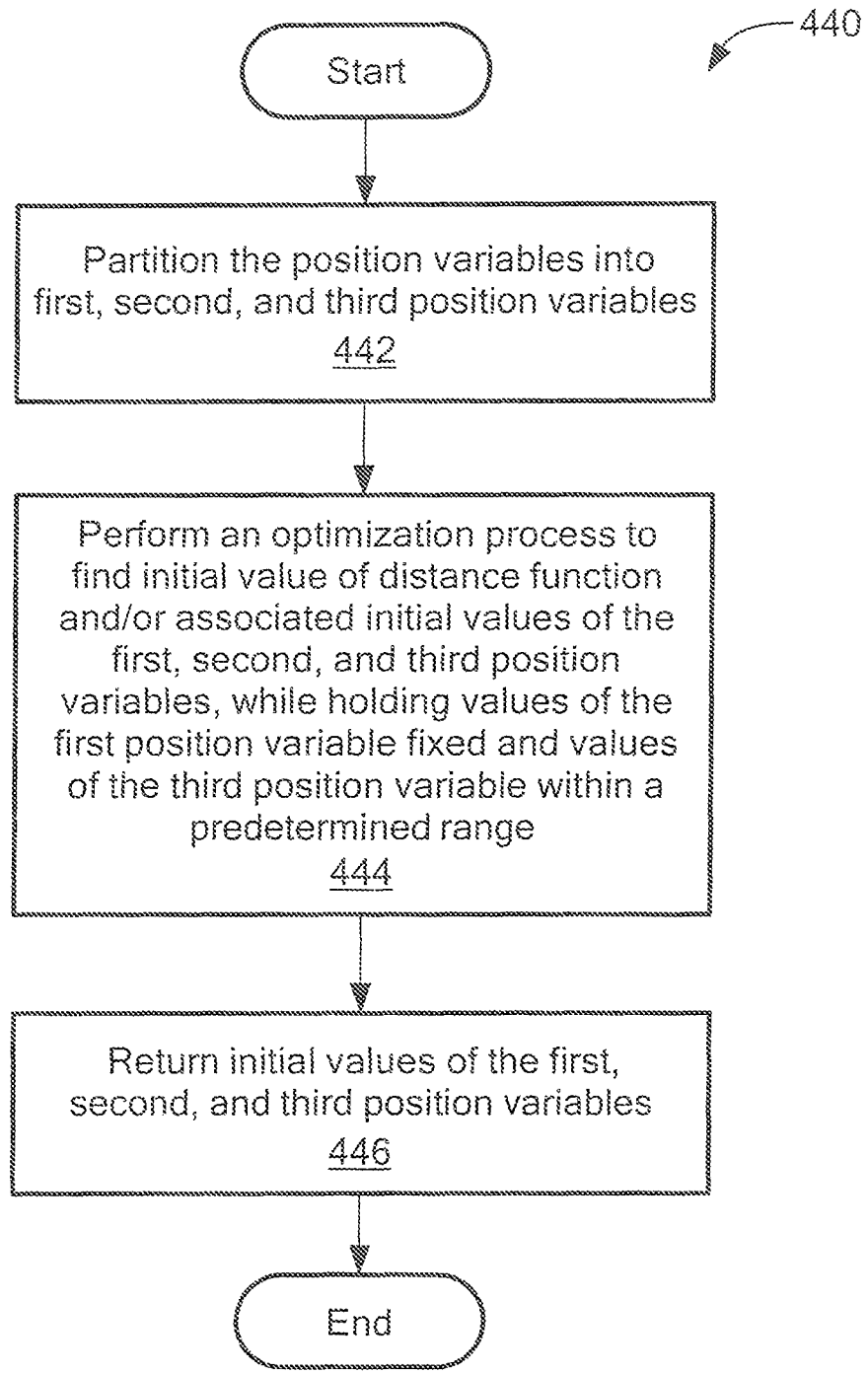

Techniques described below in conjunction with FIGS. 4, 4A, and 4B are illustrative of a method that can find the global minimum in any number of dimensions.

Points P1-P3 and P5-P6, or any point other than P4, are indicative of points on (i.e., evaluations of) the distance function 702 at which a process to find the global minimum P4 of the distance function 702 at the magnet position x4 may begin. Thus, the points P1-P3 and P5-P6 are indicative of initial distance function values, or starting distance function values, or approximate distance function values (and associated position variable values x1-x3 and x5-x6), from which the global minimum P4 of the distance function 702 at position x4 may be found, iteratively or otherwise.

In general, it may be desirable to identify the global minimum P4 at position x4 as rapidly as possible. For example, if the above techniques are used to identify a rapidly moving magnet, it is desirable to identify the global minimum rapidly. To this end, it will be understood that starting at the value P3 at position x3, near the global minimum, may lead to finding the global minimum P4 at position x4 more rapidly than starting at the points P1-P2 or P5-P6. Starting at the value P3, as opposed to the values P1-P2 or P5-P6, may also lead to finding the global minimum P4 at position x4 rather than finding the local minima.

For clarity, the graph 700 shows a distance function in only one dimension, X. However, it should be understood that a distance function can be in one, two, three, four, five, or six position variable dimensions and similar local and global minima apply.

Figures below describe examples of identification of a position or location of a magnet with possible movement in fewer than six degrees of freedom. However, it should be understood that the same or similar techniques can be used to find a position of a magnet with one, two, three, four, five, or six degrees of freedom of movement.

Figure 1A:
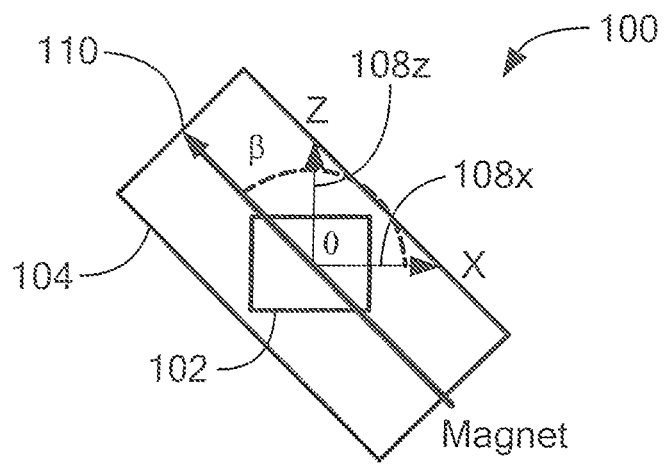
FIG. 1A is a top view of the system of FIG. 1.
Figure 1B:
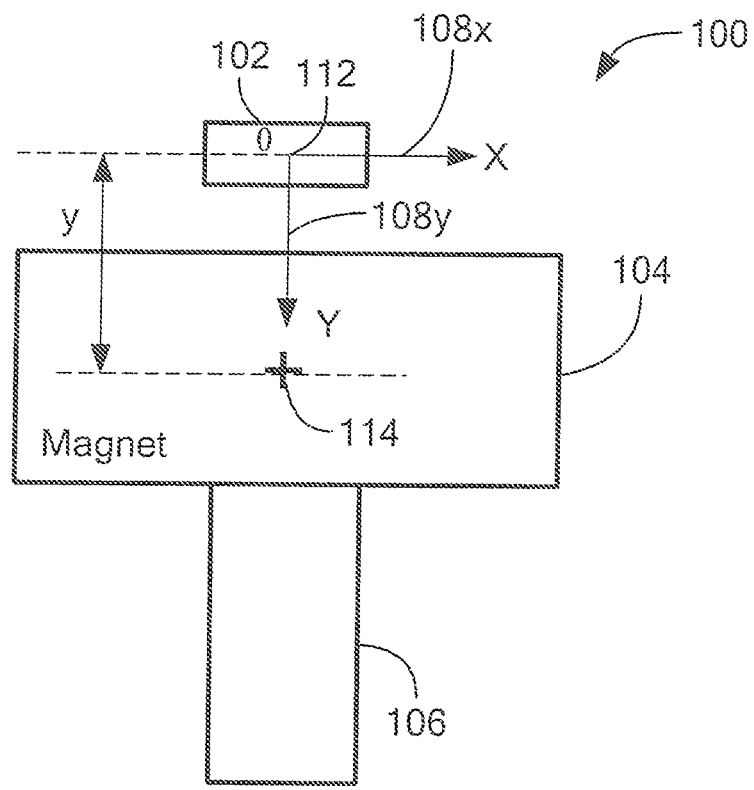
FIG. 1B is a side view of the system of FIG. 1.

Referring now to FIGS. 1, 1A, and 1B, an illustrative system 100 includes a magnetic field sensor (or "sensor") 102 proximate to a magnet 104 mounted along an end of a shaft 106. The shaft 106 and magnet 104 may rotate around a Y-axis 108y of coordinate system 108 having X-axis 108x, Y-axis 108y, and Z-axis 108z.

The magnet 104 may have a known geometry (i.e., shape) and/or magnetization. In the embodiment shown, the magnet 104 is a parallelepiped having a magnetization described by north and south poles. As shown in FIG. 1A, the magnet 104 may have a magnetization direction 110. In some embodiments, the magnet 104 is a permanent magnet.

As the magnet 104 rotates around the Y-axis 108y, it has an angle of rotation Q which may be defined relative to the X-axis 108x as shown in FIG. 1A. The magnet 104 may mounted at a distance y from sensor 102 as shown in FIG. 1B. The mounting distance y may be defined as a relative distance along the Y-axis 108y between a point 112 on the magnetic field sensor 102 and a point 114 on the magnet 104. The points 112, 114 may be, for example, geometric centers of the magnetic field sensor 102 and magnet 104, respectively.

In various embodiments, the magnetic field sensor 102 (or other electronic circuitry within the system 100) is configured to determine the angle of rotation $\beta$ and mounting distance y (i.e., a position or location of the magnet 104 in two degrees of freedom) using techniques described herein. The magnetic field sensor 102 may determine the instantaneous distance along the Y-axis 108y and angle of rotation $\beta$ as the shaft 106 and magnet 104 rotate.

It should be appreciated that FIGS. 1, 1A, 1B show an end-of-shaft angle sensing application with two unknown variables ($\beta$, y), wherein the relative position of the magnet 104 and magnetic field sensor 104 along the X-axis and Z-axis, and also rotation about the X-axis and about the Z-axis are assumed to be fixed. The unknown variables ($\beta$, y), may be referred to as "magnet position variables" or simply "position variables."

As described further below, the concepts and techniques herein can be applied to various types of magnetic field sensing applications having an arbitrary number of magnet position variables, e.g., one, two, three, four, five, or six (i.e., up to six) position variables that describe a position of the magnet in up to six degrees of freedom.

Figure 1C:
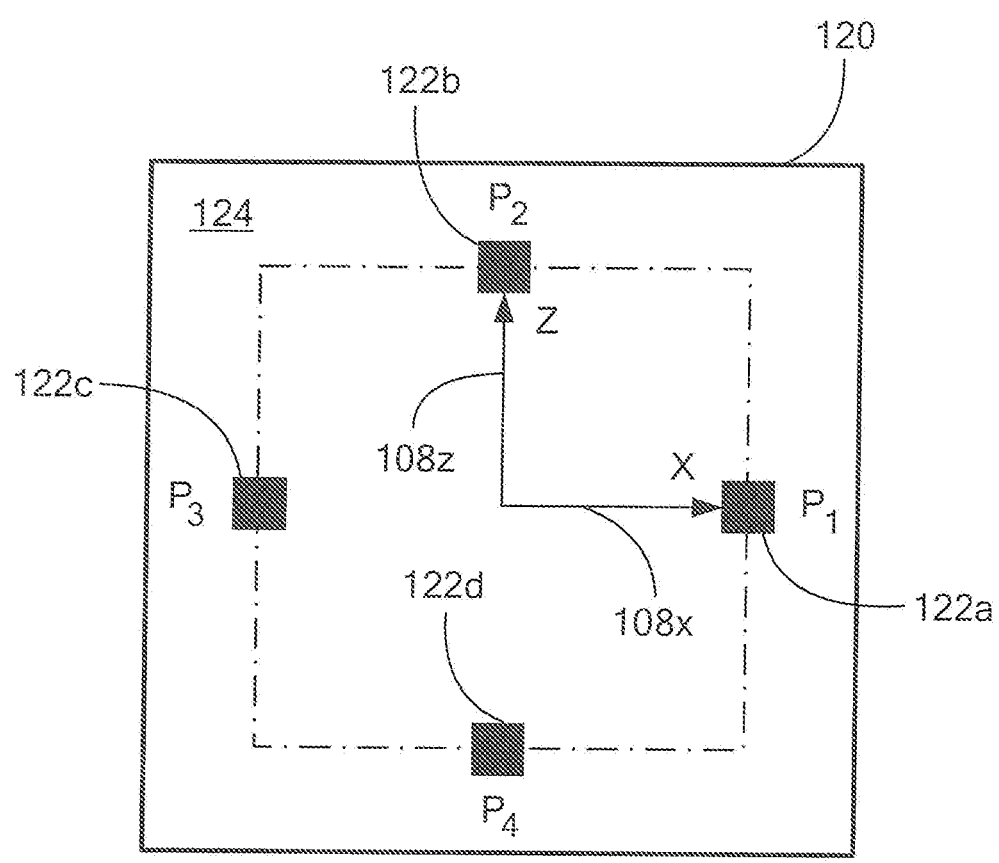
FIG. 1C is a diagram showing an illustrative arrangement of magnetic field sensing elements that may be used in some embodiments of the magnetic field sensor of FIGS. 1-1B.

Referring to FIG. 1C, in which like elements of FIGS. 1, 1B, and 1C are shown using like reference designations, a structure 120 (part of magnetic field sensor 102) includes four magnetic field sensing elements 122a, 122b, 122c, 122d (122 generally) that may be arranged on a substrate 124 as shown. In some embodiments, the magnetic field sensing elements 122 may be planar Hall elements having axes of maximum sensitivity perpendicular to the substrate 124 and, thus, along a Y-axis in the embodiment of FIG. 1C (the Y-axis extends into the page of FIG. 1C in accordance with visible X-axis and Z-axis 108x, 108z).

Each of the magnetic field sensing elements 122 may provide a magnetic field measurement of the magnet 104 (FIG. 1). For a given magnet mounting distance $y_m$ and angle of rotation $\beta_m$, collectively referred to as the magnet position, each of the magnetic field sensing elements 122a, 122b, 122c, 122d may provide a respective measurement $B_{mes1}$, $B_{mes2}$, $B_{mes3}$, and $B_{mes4}$ of the magnetic field B generated by magnet 104. The measurements may be expressed as function of magnet position, for example, a first sensing element 122a may be said to measure field $B_{mes1}$ ($y_m$, $\beta_m$), a second sensing element 122b to measure field $B_{mes2}$($y_m$, $\beta_m$), a third sensing element 122c to measure field $B_{mes3}$($y_m$, $\beta_m$), and a fourth sensing element 122d to measure a field $B_{mes4}$($y_m$, $\beta_m$).

By techniques described below, the actual magnet position ($y_m$, $\beta_m$), which is generally unknown, may be determined using the magnetic field measurements $B_{mes}$ and one or more models of the magnet 104 that describe a calculated (i.e., predicted) magnetic field about the magnet 104.

Four magnet models $B_{calc1}$(y,$\beta$), $B_{calc2}$(y,$\beta$), $B_{calc3}$(y,$\beta$), and $B_{calc4}$(y,$\beta$) may be used, each one in accordance with physical characteristics (e.g., sensitivity and maximum response axis) and physical positions of each respective magnetic field sensing element 122a, 122b, 122c, and 122d. In the end-of-shaft angle sensing application of FIGS. 1, 1A, 1B, the magnet models may be based on the assumption that the relative position of the magnet 104 and magnetic field sensing elements 122 along the X-axis and Z-axis 108x, 108z and rotations of the magnet about the X-axis and the Z-axis are generally fixed. The four models $B_{calc}$ may be similar in that they may be each based on the same known magnet geometry and magnetization, but may differ in that each is based on relative position between the magnet and one of the four different magnetic field sensing elements 122a, 122b, 122c, 122d.

To determine the unknown magnet position, ($y_m$, ($\beta_m$), an optimization process may be used that seeks to minimize a distance function that is based on the magnet models $B_{calc}$ and one or more magnetic field measurements $B_{mes}$. In some embodiments, rather than using four separate absolute measurements, the distance function calculates a mathematical norm of a numerical difference between a vector of one or more magnetic field measurements $B_{mes}$ and a vector of one or more calculated magnetic fields values $B_{calc}$.

In the embodiment of FIGS. 1 and 1A-1C, instead of absolute measurement and related absolute magnet model values, a differential magnetic field sensing scheme may be used to determine unknown magnet position ($y_m$, $\beta_m$). In particular, first differential magnetic field measurements $\Delta_{mes1}$($y_m$, $\beta_m$) may be taken using the first and third sensing elements 122a, 122c, and second differential magnetic field measurements $\Delta_{mes2}$($y_m$, $\beta_m$) may be taken using the second and further sensing elements 122b, 122d, for example, as follows:

$$\Delta_{mes1}(y_m,\beta_m)=B_{mes3}(y_m,\beta_m)-B_{mes1}(y_m,\beta_m) \tag{7}$$

$$\Delta_{mes2}(y_m,\beta_m)=B_{mes4}(y_m,\beta_m)-B_{mes2}(y_m,\beta_m) \tag{8}$$

Likewise, first differential calculated magnetic fields $\Delta_{calc1}$(y,$\beta$) may be produced using the first and third magnet models $B_{calc1}$, $B_{calc3}$, and the second differential calculated magnetic fields $\Delta_{calc2}$(y,$\beta$)=may be produced using the second and fourth magnet models $B_{calc2}$, $B_{calc4}$, for example, as follows:

$$\Delta_{calc1}(y,\beta)=B_{calc3}(y,\beta)-B_{calc1}(y,\beta) \tag{9}$$

$$\Delta_{calc2}(y,\beta)=B_{calc4}(y,\beta)-B_{calc2}(y,\beta) \tag{10}$$

Using the aforementioned differential magnetic field sensing scheme, a distance function d may be defined using the differential magnetic fields measurements and calculations, such as follows:

$$d(y,\beta) = \|\Delta_{mes}(y_m,\beta_m)-\Delta_{calc}(y,\beta)\| = \left\| \begin{array}{c} \Delta_{mes1}(y_m,\beta_m)-\Delta_{calc1}(y,\beta) \\ \Delta_{mes2}(y_m,\beta_m)-\Delta_{calc2}(y,\beta) \end{array} \right\| = \sqrt{(\Delta_{mes}(y_m,\beta_m)-\Delta_{calc1}(y,\beta))^2+(\Delta_{mes2}(y_m,\beta_m)-\Delta_{calc2}(y,\beta))^2} \tag{11}$$

where the symbol $\|\ \|$ stands for the Euclidean norm (or 2-norm) of a matrix.

For selected magnet position variables, e.g., y and β, the distance function d(y,β) returns (i.e., is evaluated to be) a scalar value indicating a how "close" the calculated differential field values $\Delta_{calc}(y,\beta)$ are to the measured differential magnetic field $\Delta_{mes}(y_m,\beta_m)$. The distance function d(y,β) is minimized when $\Delta_{mes1}(y_m,\beta_m) = \Delta_{calc1}(y,\beta)$, $\Delta_{mes2}(y_m,\beta_m) = \Delta_{calc2}(y,\beta)$, that is when $y=y_m$ and $\beta=\beta_m$ (assuming perfect magnet models and perfect measurements).

As mentioned above, an unknown magnet position $(y_m, \beta_m)$ may be determined using an optimization process that seeks to minimize the distance function d(y,β).

In some embodiments, a minimum of the distance function d(y,β) can be found using a steepest descent principle. For example, an n-dimensional plot (n-dimensional distance function) may be generated (where n is the number of unknown magnet position variables) and, starting at some chosen initialization point, an algorithm can follow the largest negative gradient of the plot (i.e., slope in the case of a 2-D plot) and iterate until the gradient is zero.

In general, for a function $f$ of n variables in $\mathbb{R}$ defined as:

$$f(X) \text{ with } X=(x_1, x_2, \ldots x_n) \text{ in } \mathbb{R}^n \qquad (12)$$

minimizing f may include finding $X_m$ such that:

$$f(X_m) \leq f(X) \text{ for all } X \text{ in } \mathbb{R}^n \qquad (13)$$

It will be appreciated from FIG. 7 described above that one issue with minimization is to find a global minimum of $f$ and not a local minimum. Techniques for finding a minimum include iterative techniques (e.g., Quasi-Newton and Simplex), but these tend to find a local minimum, if any, and heuristic techniques (e.g., Genetic algorithm and Simulated annealing). In various embodiments, one or more techniques described below in conjunction with FIGS. 4, 4A, 4B, and 5 may be used to find a global minimum.

It should be appreciated that the distance function shown is a 2-variable (mounting distance and angle of rotation) distance function that may be used to determine the position of a magnet. It will be appreciated that in other embodiments, the concepts, structures, and techniques can be used with more than two or fewer than two magnetic position variables, e.g., any number of the six degrees of freedom. As one example, the techniques described herein may be applied to side shaft angle sensing applications.

The general concepts and techniques sought to be protected herein may be used with various types of magnetic field measurements including absolute magnetic fields measurements, differential magnetic fields measurements, and angular measurements. The magnet models may be adapted in order to calculate, for example, the magnetic field at some positions, the magnetic field angle at other positions and the cosine of the magnetic field angle at some other positions. Moreover, different types of measurements may be used in combination. While mixing measurement types, it could be necessary to normalize each measurement and the magnet models otherwise the distance function might be dominated by some measurements.

In some embodiments, it may be desirable to obtain at least n+1 distinct measurements, where n is the number of unknown magnet position variables. However, in some embodiments, it is possible to use n distinct measurements, or even fewer than n distinct measurement.

In certain embodiments, the distance between magnetic field sensing elements may be selected to have a good overview of the moving magnet. In other words, for example, for a particular illustrative magnet, if there are four magnetic field sensing elements very close to each other, for example, 0.1 millimeters from each other, the four magnetic field sensing elements may sense approximately the same magnetic field. In this example, output signals from the four magnetic field sensing elements may be nearly the same, and thus, the information provided by the four magnetic field sensing elements may actually be information from any one of the four magnetic field sensing elements. In contrast, if the magnetic field sensing elements are further apart, for example, three millimeters from each other, the four magnetic field sensing elements may sense different magnetic fields. In this example, output signals from the four magnetic field sensing elements may not be the same, and thus, the information provided by the four magnetic field sensing elements may be information from all four magnetic field sensing elements, which may be preferred.

While four planar Hall elements 122a, 122b, 122c, 122d are described in FIG. 1C, in other embodiments, other types of and other quantities of magnetic field sensing elements can be used. For example, in one embodiment, two planar Hall elements and two vertical Hall elements can be used in single ended arrangements or in differential arrangements, yielding, for example, magnetic field measurement in two orthogonal directions.

In some embodiments, to improve accuracy, it may be desirable to compensate for magnet strength change with temperature. For example, ferrite magnet strength Br typically changes with temperature with a linear rate Δ of −0.2%/° C. (20% strength loss for a 100° C. increase of temperature). Otherwise said, the system would need a temperature sensor and the function $f_{M,P}$, which calculates the effect of the magnet on the sensing elements, would take into account the temperature variation. This is easy to do since the behavior is mostly linear with temperature. For example, in equation (14) below, the magnetization M, which is known at room temperature 20° C., can be calculated at any temperature t with:

$$M(t) = M(20°\text{ C.}) \cdot \left(1 + \frac{t-20}{100} \cdot \Delta\right) \qquad (14)$$

It should be appreciated that either the calculated magnetic fields (i.e., model magnetic fields), the measured magnetic fields, both, or neither can be compensated to adjust for the effects of temperature.

Figure 2A:
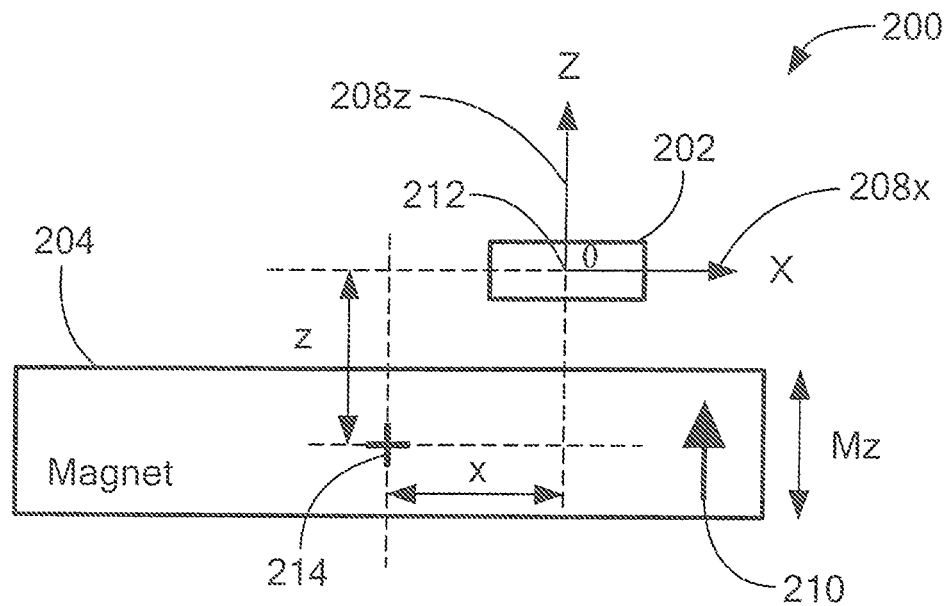
FIG. 2A is a side view of illustrative system having a magnetic field sensor proximate to a magnet, with magnet movement along two orthogonal axes.
Figure 2B:
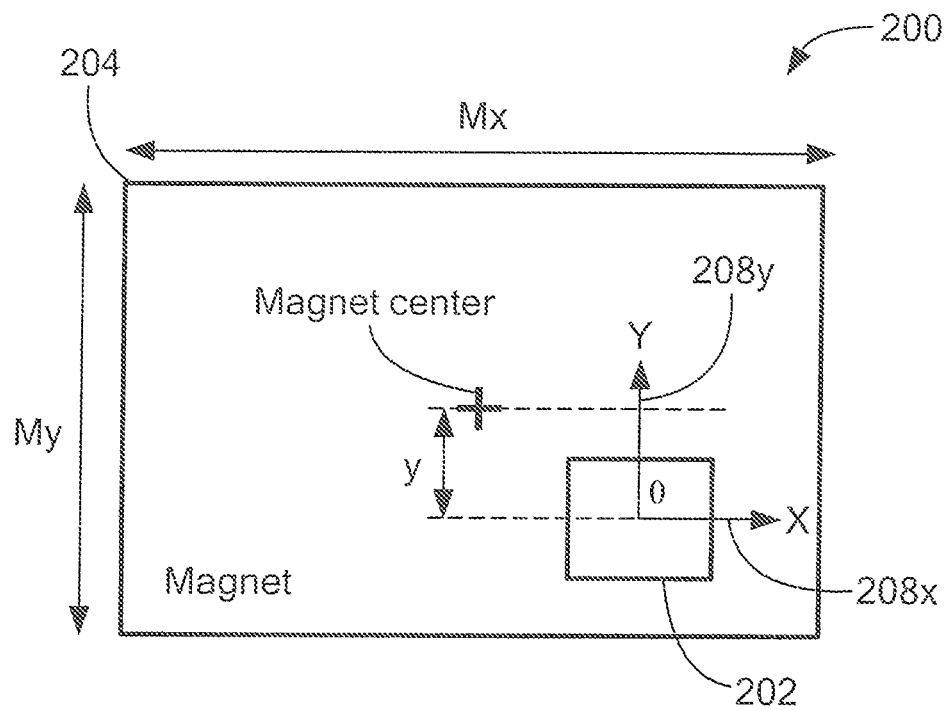
FIG. 2B is a side view of the system of FIG. 2A.

Referring to FIGS. 2A and 2B, another illustrative system 200 includes a magnetic field sensor (or "sensor") 202 proximate to a magnet 204. The magnet 204 has a position (x,y,z) relative to the magnetic field sensor 202, where x represents a distance along an X-axis 208x between a point 212 on the magnetic field sensor 202 and a point 214 on the magnet 204, y represents a distance along an Y-axis 208y between points 212 and 214, and z represents a distance along an Z-axis 208z between points 212 and 214.

In some embodiments, the magnet 204 is mounted at distance z from the sensor 202 and is generally free to move about the X-Y plane (i.e., the plane formed by the X-axis and Y-axis 208x, 208y, respectively). Each of the magnet position variables x, y, and z may be treated as unknowns within the system. Because the magnet is generally free to move in the X-Y plane but is mounted along the Z-axis, it may be said that the uncertainty of both x and y positions is greater than the uncertainty of z position.

An illustrative application that may use two dimensional linear movement is a so called "All Gear" application, in which a magnetic field sensor detects all gear selections in a manual gearbox of an automobile. This magnetic field sensor can detect, for example, two linear movements (or one linear and one rotation) as a gear shift lever is moved.

The magnet 204 has a known geometry and/or magnetization. In the embodiment shown, the magnet 204 is a parallelepiped having a length Mx along the X-axis 208x, My along the Y-axis 208y, and Mz along the Z-axis 208z. The magnet may have a magnetization direction 210, as shown. In one embodiment, Mx, My, and Mz are each about fifteen millimeters.

Figure 2C:
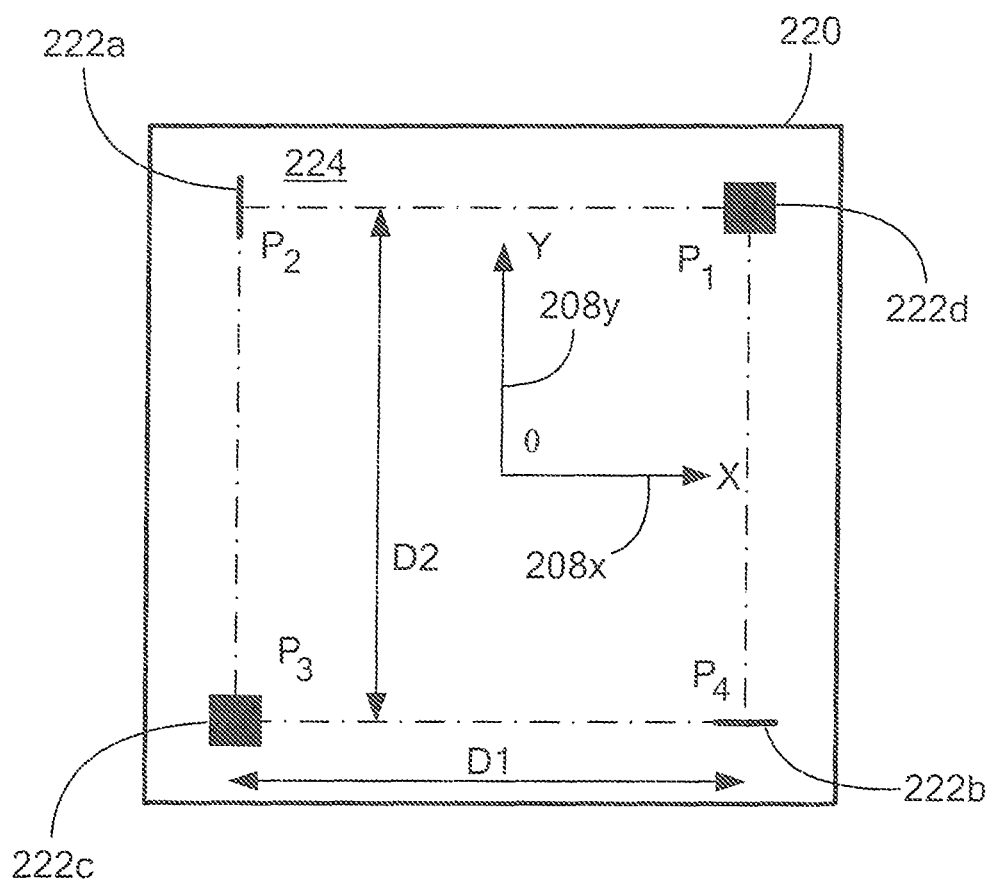
FIG. 2C is a diagram showing an illustrative arrangement of magnetic field sensing elements that may be used in some embodiments of the magnetic field sensor of FIGS. 2A and 2B.

Referring to FIG. 2C, in which like elements of FIGS. 2A and 2B are shown using like reference designations, a structure 220, part of magnetic field sensor 202, can include four magnetic field sensing elements 222a, 222b, 222c, 222d (222 generally) that may be arranged on a substrate 224 as shown. A first magnetic field sensing element 222a may be arranged to have a maximum sensitivity along the X-axis 208x, a second magnetic field sensing element 222b to have a maximum sensitivity along the Y-axis 208y, and third and fourth magnetic field sensing elements 222c, 222d to have maximum sensitivities along the Z-axis (the Z-axis extends out of the page of FIG. 2C). In some embodiments, first and second magnetic field sensing elements 222a, 222b can be can be vertical Hall elements, and third and fourth magnetic field sensing elements 222c, 222d can be planar Hall elements. As shown in FIG. 2C, magnetic field sensing elements 222a, 222c may be separate from magnetic field sensing elements 222d, 222b along the X-axis 208x by a distance D1, and magnetic field sensing elements 222a, 222d may be separate from magnetic field sensing elements 222c, 222b along the Y-axis 208y by a distance D2.

Each of the magnetic field sensing elements 222 may provide a magnetic field measurement of the magnet 204. For a given magnet position $(x_m, y_m, z_m)$, the magnetic field sensing elements 222a, 222b, 222c, 222d may provide respective measurements $B_{mes1}(x_m, y_m, z_m)$, $B_{mes2}(x_m, y_m, z_m)$, $B_{mes3}(x_m, y_m, z_m)$, and $B_{mes4}(x_m, y_m, z_m)$. In addition, for each sensing element 222a, 222b, 222c, 222d, a respective magnet model $B_{calc1}(x,y,z)$, $B_{calc2}(x,y,z)$, $B_{calc3}(x,y,z)$, and $B_{calc4}(x,y,z)$, i.e., predicted values of magnetic field, i.e., predicted magnetic field variable values in directions (x,y,z), may be based on known geometry and magnetization of the magnet 204, and the relative position of the sensing elements 222 to the magnet 204.

To determine the unknown magnet position $(x_m, y_m, z_m)$, an optimization process may be used that seeks to minimize a distance d function that is based on the magnet models $B_{calc}$ and one or more magnetic field measurements $B_{mes}$. In some embodiments, the distance function calculates a mathematical norm of a difference between a vector of or more magnetic field measurements $B_{mes}$ and a vector of one or more calculated magnetic fields values $B_{calc}$. In certain embodiments, the following distance function may be used:

$$d(x, y, z) = \|B_{mes}(x_m, y_m, z_m) - B_{calc}(x, y, z)\| \quad (15)$$

$$= \left\| \begin{array}{c} B_{mes1}(x_m, y_m, z_m) - B_{calc1}(x, y, z) \\ \vdots \\ B_{mes4}(x_m, y_m, z_m) - B_{calc4}(x, y, z) \end{array} \right\|$$

$$= \sqrt{\begin{array}{c}(B_{mes1}(x_m, y_m, z_m) - B_{calc1}(x, y, z))^2 + \\ (B_{mes2}(x_m, y_m, z_m) - B_{calc2}(x, y, z))^2 + \ldots + \\ (B_{mes4}(x_m, y_m, z_m) - B_{calc4}(x, y, z))^2 \end{array}} \quad (16)$$

As described above, it should be appreciated that evaluation of the 3-variable distance function returns a scalar value. The combination of magnetic field variable values (x,y,z) that minimizes and evaluation of the distance function d may be used as a prediction of the actual magnet position $(x_m, y_m, z_m)$. In some embodiments, the range of one or more position variable values x, y, z may be selected based upon operating assumptions. For example, it may be assumed that the magnet position may change +/−1 mm along X-axis and Y-axis 208x, 208y (i.e., $x_m$ and $y_m$ may have a range [−11 mm, 11 mm]) and that the magnet mounting position may vary between 6 mm and 8 mm along the Z-axis 208z (i.e., $z_m$ may have a range [6 mm, 8 mm])

In other embodiments, other ranges may be assumed.

Figure 3:
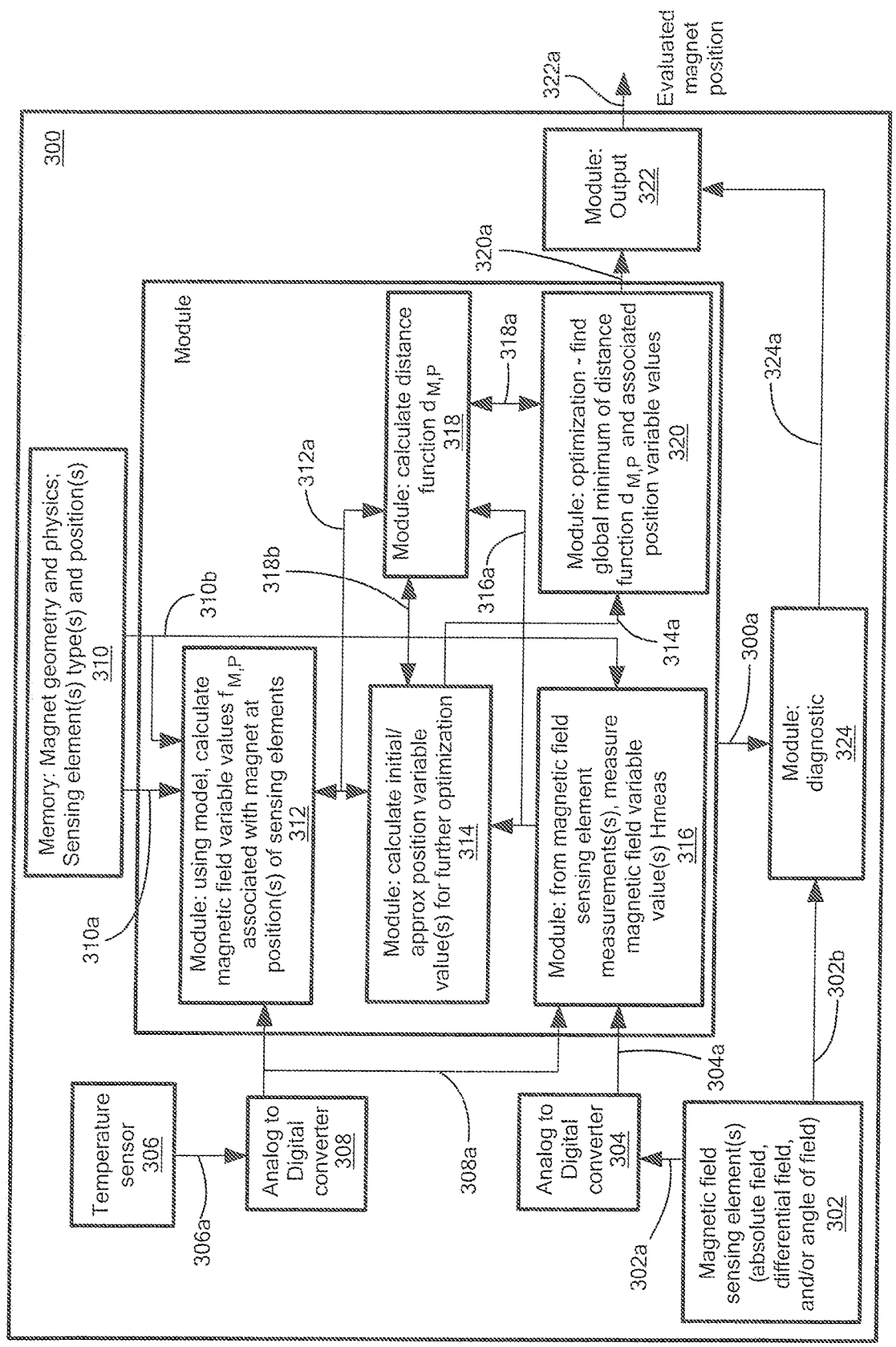
FIG. 3 is a block diagram of a magnetic field sensor, for example, in accordance with some embodiments.

Referring now to FIG. 3, an illustrative magnetic field sensor 300 can include one or more magnetic field sensing elements 302 coupled in single ended (absolute) or differential arrangements. The one or more magnetic field sensing elements 302 can generate one or more magnetic field signals 302a, which can be single ended (absolute) or differential signals.

The magnetic field signal 302a can be received by an analog-to-digital converter 304 to generate a converted signal 304a.

A module 316 can be coupled to the converted signal 304a.

A memory device 310 can include a plurality of stored values. Some of the stored values can describe a sensed magnet in a particular way, e.g., a sensed magnet geometry and physics, referred to herein as values A.

In some embodiments, the stored values can describe the sensed magnet in a different way, e.g., calculated (or predicted) magnetic field variable, $f_{M,P}$, calculated at a plurality of possible positions of the magnet, referred to herein as values B.

In some embodiments, the stored values can describe the sensed magnet in a different way, e.g., pre-measured magnetic field variable values, Hmeas, measured at a plurality of possible positions of the magnet, measured during or before production of the magnetic field sensor 300, and referred to herein as values C.

Some other ones of the stored values can describe the magnetic field sensing element(s) 302 in a particular way, e.g., types, sensitivity, temperature coefficient (e.g., sensitivity change with temperature), and physical positions of the magnetic field sensing element(s) 302, referred to herein as values D.

In some embodiments, the module 316 can also be coupled to receive stored values 310b, e.g., values D above, that describe the magnetic field sensing element(s) 302. The module 316 can be operable to generate one or more measured magnetic field variable values, Hmeas, e.g., in up to three dimensions. In some embodiments, the one or more measured magnetic field variable values can be temperature compensated by the module 316 in accordance with the received stored values 310b that describe the magnetic field sensing element(s) 302.

A module 312 can receive stored values 310a, values A, B, or C, that describe the sensed magnet and can receive the stored values 310b, values D, that describe the magnetic field sensing element(s) 302.

In some embodiments that use values A or B described above, using a model, for example, Maxwell equation approximations described above, e.g., in equation (6), the module 312 can be operable to generate magnetic field variable values, $f_{M,P}$, that describe expected magnetic fields around the magnet in up to three dimensions, and in the one or more of the six degrees of relative motion of the magnet relative to the magnetic field sensing elements 302. In some embodiments, the one or more calculated magnetic field variable values can be temperature compensated by the module 312 in accordance with the received stored values 310b that describe the magnetic field sensing element(s) 302.

In some alternate embodiments that use values C described above, the magnetic field variable values that describe the magnet are pre-calculated as values 310a, $f_{M,P}$, which are directly received by the module 312, in which case, only temperature compensation may be done by the module 312, and predictions by the model need not be done in the magnetic field sensor 300.

A module 314 can receive calculated magnetic field variable values 312a around the sensed magnet and can receive the measured magnetic field variable values, Hmeas, β16a at the present position of the sensed magnet. The calculated magnetic field variable values 312a can be associated with the measured magnetic field variable values 316a, i.e., the values 312a of the calculated magnetic field variables (x, y, z, α, β, γ) retrieved from the module 312 can have one or more of the measured magnetic field variable values 316a of the measured magnetic field variables (x,y,z).

The module 314 can calculate an initial or approximate value of a distance function, for example, P3 of 702 FIG. 7 and an initial or approximate value of one or more position variables, e.g., x3 of FIG. 7. The module 314 can provide as an output 314a, the initial or approximate value of the one or more position variables. FIGS. 4A and 4B describe illustrative techniques to generate the initial or approximate value of one or more position variables 314a. To this end, the module 314 may use calls to and returned values from (represented by arrow 318b) a distance function module 318 to identify the initial or to approximate distance function value (e.g., P3 of FIG. 7) and corresponding initial or one or more approximate position variable values (e.g., x3 of FIG. 7).

The module 318 can be coupled to the measured magnetic field variable values 316a, Hmeas, and to the calculated magnetic field variable values 312a, $f_{M,P}$, and can return a distance function scalar value, (represented by arrow 318a). Individual points on the curve 702 of FIG. 7 show an example of scalar values, P, of a distance function and associated values of a position variable, x, with one degree of freedom.

A module 320 coupled to receive the scalar distance function values 318a, (e.g., points on curve 702 of FIG. 7), coupled to receive the initial or approximate position variable values 314a (e.g., x3 of FIG. 7), can generate a global minimum of the distance function, and can return an estimated or actual position 320a, in up to six degrees of freedom, of the sensed magnet (not shown) (e.g., at x4 of FIG. 7) proximate to the magnetic field sensor 300.

A diagnostic module 324 can be coupled to the one or more magnetic field sensing elements 302 and/or to the module 305 and can generate diagnostic information 324a.

An output module 322 can combine the estimated or actual magnet position variable value 320a with the diagnostic information 324a and can generate and output signal indicative of the actual magnet position and indicative of the diagnostic information. However, in some embodiments, the diagnostic module 324 and the diagnostic information 324a are not provided.

In some embodiments, the magnetic field sensor 300 can include a temperature sensor 306 to generate a temperature signal indicative of a temperature of the magnetic field sensor. An analog-to-digital converter 308 can be couple to the temperature signal and can generate a converted temperature signal 308a.

The converted temperature signal 308a can be provided to one of, or both of, the modules 312, 316. With a converted temperature signal 308a, one of, or both of, the modules 312, β16 can compensate for sensitivity effect of temperature upon the one or more magnetic field sensing elements 302 or upon the model of module 312, for example, using the equation (14) above.

In some embodiments, the module 314 is not used and initial or approximate position variable values 314a are not used. These embodiments may be well suited for systems in which the distance function has only a global minimum and no local minimum. Instead, the module 320a finds a minimum of a distance function, and the corresponding magnet position, with a pre-calculated starting point.

In other embodiments, the module 320 is not used. Instead, the approximate position variable value(s) 314a are directly sent to the output module 322. These embodiments may be well suited for systems where very high speed of movement of the sensed magnet is necessary.

FIGS. 4, 4A, 4B, and 5 are flow diagrams showing illustrative processing that can be implemented within, for example, the magnetic field sensor 300 of FIG. 3. Rectangular elements (typified by element 402 in FIG. 4), herein denoted "processing blocks," represent computer software instructions or groups of instructions. Diamond shaped elements (typified by element 502 in FIG. 5), herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring now to FIG. 4, a process begins at block 402, where one or more magnetic field measurements proximate to a magnet are obtained using one of more magnetic field sensing elements, for example, the one or more magnetic field sensing elements 302 of FIG. 3. As described above, the magnetic field measurement can be differential measurements, each measurement taken as a difference of measurement by two magnetic field sensors, or single ended measurements for which each magnetic field measurement is taken by a separate respective magnetic field sensing element. These measurements result in the above-described measured magnetic field variables values 316a of FIG. 3 of at least one of the measure magnetic field variable (x,y,z)

At block 404 calculated magnetic fields are determined using a model of the sensed magnet. These calculations result in the above-described calculated magnetic field variables 312a of FIG. 3. As described above in conjunction with FIG. 3 the calculated magnetic field variable values can be calculated and stored in advance or can be calculated during operation of the magnetic field sensor.

At block 406, initial values of one or more position variables associated with the sensed magnet are determined, for example, in accordance with FIG. 4A or 4B. See also blocks 312 and 314 of FIG. 3. Block 406 can call the calculated magnetic field variable values (see dashed lines) from block 404 in accordance with the measured magnetic field variable values measured at block 402.

At block 408, an optimization process is performed to determine optimized values of the position variables initialized at block 406, for example, in block 320 of FIG. 3. The optimization process minimizes a distance function, which corresponds to the optimized values of the position variables. The optimization process can be initialized with the initial values of the corresponding position variables according to values 314a of FIG. 3. The distance function can use (e.g., can call, see dashed lines) the calculated magnetic field variable values (e.g., the values 312a of FIG. 3), calculated or obtained at block 404, and can use the magnetic field measurements (e.g., the values 316a of FIG. 3) of block 402, and minimizes a numerical distance between the model and the measurements.

At block 410, the process 400 returns an estimated or actual position of the sensed magnet, e.g., one or more associated position variable values.

Two methods of generating the initial values of position variables at block 406 are described below in conjunction with FIGS. 4A and 4B. However, these are only two methods that can be used to find the initial or approximate position variable values. In some embodiments the initial values of position variables can be any values in the range of position variable values, (see, e.g., x1 and x6 of FIG. 3).

As described above, in some embodiments, block 406 is eliminated. In other embodiments, the optimization of block 408 does not use the initial position variable values of block 406.

Referring now to FIG. 4A, in a process 420, also referred to herein as a "brute force" method of finding the initial or approximate position variable values, begins at block 422.

At the block 422, of a plurality of position variable values can be used with the model of the magnet to describe magnetic fields around the sensed magnet, the position variable values are discretized into ranges of values. The discretized position variable values are associated with discretized calculated magnetic field variable values. The discretized position variable values can be reduced in range (s), or can simply be more granular than resolution of position variable values otherwise desired for the application. The discretized position variable values can be described as a grid of calculated and discretized position variable values.

At block 424, using the grid of calculated and discretized position variable values, using a model of the field generated by the sensed magnet (calculated magnetic field variable values at associated discretized position variable values), and using the measured magnetic field (measured magnetic field variable values) measured by the one or more magnetic field sensing elements of block 302 of FIG. 3, a minimum of a discretized distance function can be calculated. The minimum of the discretized distance function can be associated with initial or approximate discretized position variable values.

At block 426, the initial or approximate position variable values can be returned to the main function 400.

The above brute force method finds an approximate global minimum of the distance function $d_{M,P}$ by brute force, corresponding to the approximate position $(L_a, T_a)$ of the magnet, and can thereafter refine this approximate minimum with, for example, a fast iterative optimization algorithm (like simplex) starting at $(L_a, T_a)$. This will return the evaluated magnet position $(L_e, T_e)$ (see block 410). In order to find $(L_a, T_a)$, up to six dimensions space $\mathbb{R}^6$ can be discretized in all dimensions (discretization can be different for each one of the six dimensions and not necessarily uniform). It gives a six dimensions grid G. The distance function $d_{M,P}$ is then evaluated on all points of this grid G. The approximate global minimum corresponds to the point $(L_a, T_a)$ such that $d_{M,P}(L_a, T_a)$ is a minimum on the grid.

In a non-limiting example of the method of FIG. 4, and referring to FIGS. 2, 2A, 2B, 2C, first the method 420 discretizes the 3D space (only 3D because $(\alpha, \beta, \gamma)$ are known) and creates the grid G: For example, X direction can be discretized with a 2.5 millimeter step size, Y direction can be discretized with a 2.4 millimeter step size and Z direction can be discretized with a 0.6 millimeter step size.

Then, the distance function, $d_{M,P}$, on this grid G can be calculated. For example, the minimum can be $L_a=(-2.6, 3.6, -2.8)$ expressed in millimeters. The above can be an approximate global minimum which is used as a starting point of an iterative algorithm.

Now, using, for example, a simplex minimization algorithm on the three position variables (x,y,z) and the position corresponding to the approximate global minimum of the distance function described above as the starting point, another global minimum of a non-discretized distance function can be calculated, for example, in FIG. 4, to determine a position, e.g., $(x_M, y_M, z_M)=(-1.99, 3.01, -2.51)$ of a sensed magnet (where $\alpha, \beta, \gamma$ are fixed).

The system accuracy can be evaluated on a full movement range of the magnet. Inaccuracies can be larger on the edges of the movement range because field strength is lower at these positions and, consequently, the measurement inaccuracies tend to make the detection more difficult.

Accuracy could be improved using more field measurements or a stronger/larger magnet, for example.

If the above discretization (grid) is not fine enough, the minimum returned by the initial brute force search might be close to a local minimum. On the other hand, if the discretization is too fine, then the brute force evaluation may require a lot of calculations and may consume time. Consequently, a compromise needs to be found, which depends on the computation capability, the response time required by the application and the application itself. For example: a good knowledge of the application can tell you approximately: (1) how many minima to expect (local and global), (2) where are the minima, and (3) if all the 6 dimensions are required. In some illustrative applications described above, only two dimensions may be used (the other degrees of freedom are fixed and known).

Referring now to FIG. 4B, in a process 440, also referred to herein as a "limited range" method of finding the initial or approximate position variable values, begins at block 442.

At the block 442, of a plurality of position variables in six dimensions that can be used with the model of the magnet to describe the sensed magnet position, partition the plurality of position variables into first, second, and third position variables. The first position variables can include some (e.g., three) position variables of the six position variables that are fixed in value, the second position variables can include other position variables (e.g., two) that describe full motion of the magnet, and the third position variables can include still other position variables (e.g., one) that describes limited ranges of motion of the magnet.

At block 444, using measured magnetic fields measured by the one or more magnetic field sensing elements of blocks 302 and 316 of FIG. 3, and using calculated magnetic fields calculated by the above-described model of block 312 of FIG. 3, generate a minimum of a distance function and associated initial position variable values of the second group while holding position variable values of first and third groups to be fixed. The initial or approximate distance function value is associated with or corresponds to initial or approximate position variable values of the second position variable group.

At block 446, the process 440 returns the initial or approximate values of the first, second, and third position variables identified for example, in block 406 of FIG. 4 and as described, for example in block 314 of FIG. 3.

The limited range method described above is useful when some position variables have very limited range compared to other variables. A useful example has a range of position variable values that is ten times smaller than others of the position variable values. $V_L$ can be a group of position variables with limited range and $V_N$ can be a group of position variables with large range. First, an iterative algorithm can be used to minimize a distance function $d_{M,P}$, limited to the corresponding to position variables $V_N$ and with the variables $V_L$ fixed to their nominal positions. The starting point of the optimization could be any points in the range of $V_N$ variables. This will lead to a first approximate position $(L_a, T_a)$, corresponding to an approximate minimum of the distance function. Second, the iterative algorithm can be used again to minimize a distance function, $d_{M,P}$, but starting at $(L_a, T_a)$, and on all the magnetic field variables in order to find the global minimum $(L_e, T_e)$.

While three types of (i.e., groups of) position variables are described above, in some embodiments, only the first and second, or the first and third position variables are used and the missing type is not used or is held fixed.

Note that, in a real application, if the calculation rate of the magnetic field sensor 300 of FIG. 3 is much faster than the magnet movement speed, then once the global minimum has been found thanks to one of the above algorithms (from FIG. 4A or FIG. 4B), it is not necessary anymore to use these above algorithms. Indeed, the iterative algorithm could simply be used with a starting point being the last evaluated magnet position.

In some embodiments, such as that described below in conjunction with FIG. 5, a procedure like those described above in conjunction with FIGS. 4A and 4B is only done once, or a few times, for example, at startup of the magnetic field sensor 300 or at startup of movement of a sensed magnet. In these embodiments, when the sensor is started, the position of the magnet is totally unknown, so the magnet position evaluation starts with the "brute force" method of FIG. 4A or "limited range" method of FIG. 4B in order to find initial or approximate position (i.e., position variable values). After this is done the first time, in a second part, the magnet position can be evaluated using a classical iterative minimization algorithm which is initialized with a previously calculated magnet position (i.e., position variable values). The second part described above can be referred to herein as a "tracking" method.

Figure 5:
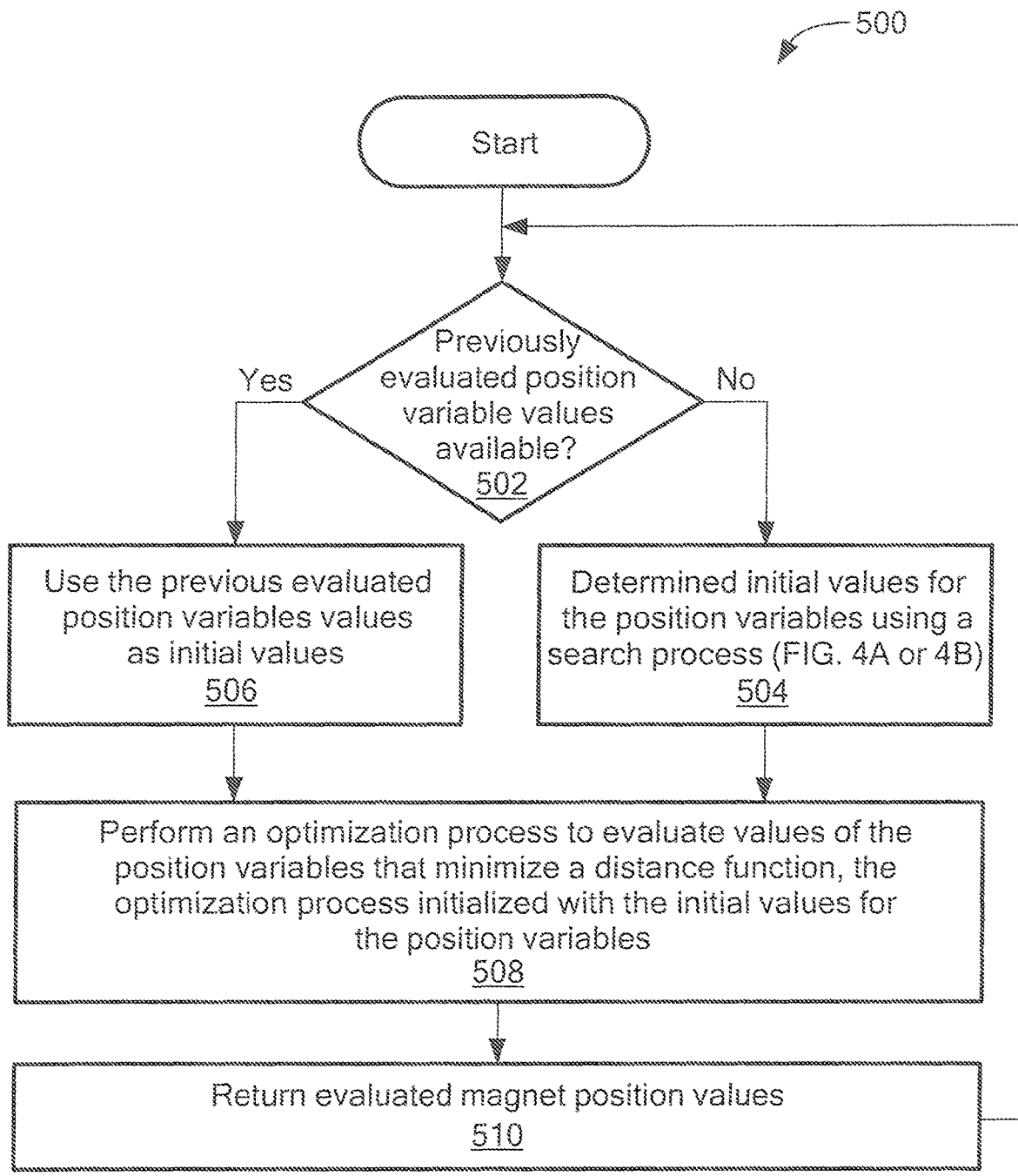

Referring now to FIG. 5, and in accordance with comments above, an illustrative process 500 begins at block 502, where it is determined if a previously evaluated position variable values have been evaluated.

If at block 502, previously evaluated position variable values are available then the method 500 proceed to block 506, where, in some embodiments, the previously evaluated position variable values can be used as initial or approximate position variable values.

At block 508, an optimization process can be used to find a global minimum of the distance function the same as or similar to block 408 of FIG. 4.

At block 510, the process 500 returns evaluated magnet position variable values.

If, at block 502, there are not previously evaluated position variable values available, then the method 500 continues to block 504, where an initial or approximate position variable values are calculated, for example, using the process of FIG. 4A or 4B.

The process then continues to block 508.

This tracking method 500 above can reduce computing time. The tracking method avoid a continual need for finding initial or approximate position variable values using the "brute force" method or "limited range" method for each position evaluation.

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A method of determining a position of a magnet, the position identified by one or more position variables, the method comprises:

generating one or more magnetic field measurements of the magnet and an associated one or more measured magnetic field variable values using one or more magnetic field sensing elements, wherein the one or more magnetic field sensing elements includes first and second magnetic field sensing elements most responsive to magnetic fields along a first axis, a third magnetic field sensing element most responsive to magnetic fields along a second axis, and a fourth magnetic field sensing element most responsive to magnetic fields along a third axis;

identifying calculated magnetic field variable values associated with a plurality of positions of the magnet, wherein the identifying the calculated magnetic field values comprises using a mathematical model to calculate a respective magnetic field expected at each of the one or more magnetic field sensing elements at a plurality of positions of the magnet;

performing an optimization process to determine a minimal value of a distance function, wherein the distance function calculates at least one difference between the calculated magnetic field variable values at positions of the one or more magnetic field sensing elements and the one or more measured magnetic field variable values, wherein the optimization process searches for the minimal value of the distance function based on the calculated at least one difference; and determining the position of the magnet by associating the minimal value of the distance function with corresponding values of the one or more position variables.

2. The method of claim 1, wherein the one or more position variables includes an angle of rotation of the magnet around a first axis.

3. The method of claim 2, wherein the one or more magnetic field sensing elements include at least two magnetic field sensing elements most responsive to magnetic fields along the first axis.

4. The method of claim 1, wherein the one or more magnetic field sensing elements are arranged to generate at least one differential measurement of the magnetic fields.

5. The method of claim 1, wherein the one or more position variables include a position of the magnet along a first axis and a position of the magnet along a second axis.

6. The method of claim 1, further comprising:
determining initial values of the one or more position variables, wherein the optimization process is initialized with the initial values of the one or more position variables.

7. The method of claim 6, wherein determining the initial values of the one or more position variables comprises:
discretizing ranges of values of selected ones of the one or more position variables to generate a plurality of discretized position variable values;
identifying a minimum numerical distance between the calculated magnetic field variable values at positions of the one or more magnetic field sensing elements for ones of the plurality of discretized position variable values and the one or more measured magnetic field variable values identifying the initial values of the one or more position variables in accordance with the minimum numerical distance.

8. The method of claim 6, wherein the determining the initial values of the one or more position variables comprises:
partitioning the one or more position variables into one or more first position variables and one or more second position variables; and
identifying a minimum numerical distance between the calculated magnetic field variable values for the one or more second position variables while holding values of the one or more first position variables fixed; and
identifying the initial values of the one or more position variables in accordance with the minimum numerical distance.

9. The method of claim 8, wherein at least one of the one or more first position variables has a smaller range than another one of the one or more first position variables.

10. The method of claim 1, where the one or more magnetic field measurements comprises two magnetic field measurements, and wherein the two magnetic field measurement are combined together to generate a differential magnetic field measurement.

11. The method of claim 1, further comprising:
determining initial values of the one or more position variables;
during a first time period, using the initial values of the one or more position variables to find an associated one or more optimized position variable values during the optimizing; and
during a second time period time period after the first time period, using the one or more optimized position variable values to find another optimized one or more position variable values during the optimizing.

* * * * *

UNITED STATES PATENT AND TRADEMARK OFFICE
CERTIFICATE OF CORRECTION

PATENT NO. : 10,782,152 B2
APPLICATION NO. : 15/678369
DATED : September 22, 2020
INVENTOR(S) : Yannick Vuillermet et al.

It is certified that error appears in the above-identified patent and that said Letters Patent is hereby corrected as shown below:

In the Specification

Column 2, Line 12 delete "measurements be" and replace with --measurements may be--.

Column 2, Line 26 delete "based on upon" and replace with --based upon--.

Column 2, Line 32 delete "the includes" and replace with --includes--.

Column 3, Line 23 delete "of illustrative" and replace with --of an illustrative--.

Column 3, Line 35 delete "embodiments." and replace with --embodiments;--.

Column 3, Line 58 delete "element (AMR)" and replace with --(AMR) element--.

Column 4, Line 45 delete "described herein as values of" and replace with --described herein as--.

Column 4, Line 54 delete "described herein as values of" and replace with --described herein as--.

Column 4, Line 57 delete "or to can" and replace with --or can--.

Column 5, Line 59 delete "axis" and replace with --axes--.

Column 6, Line 2 delete "Pi" and replace with --$P_i$--.

Column 6, Line 37 delete "below," and replace with --below--.

Column 6, Line 42 delete "measurement" and replace with --measurements--.

Column 6, Line 45 delete "L,T)" and replace with --L,T).--.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,782,152 B2

Column 6, Line 46 delete "end" and replace with --end,--.

Column 6, Line 58 delete "magnetization" and replace with --magnetization,--.

Column 7, Line 9 delete "magnetic" and replace with --magnetic fields--.

Column 7, Line 10 delete "(Le, Te)" and replace with --"($L_e$, $T_e$)--.

Column 7, Line 46 delete "P, and r'" and replace with --P, r--.

Column 8, Line 8 delete "describing position" and replace with --describing the position--.

Column 8, Line 9 delete "units" and replace with --units.--.

Column 8, Line 11 delete "4" and replace with --(4)--.

Column 9, Line 10 delete "Q" and replace with --$\beta$--.

Column 9, Line 10 delete "relative the" and replace with --relative to the--.

Column 9, Line 11 delete "may mounted" and replace with --may be mounted--.

Column 9, Line 30 delete "sensor 104" and replace with --sensor 102--.

Column 9, Line 32 delete "z-axis" and replace with --z-axis,--.

Column 9, Line 65 delete "a field" and replace with --field--.

Column 10, Line 20 delete "($\beta_m$)" and replace with --$\beta_m$,--.

Column 10, Line 28 delete "fields" and replace with --field--.

Column 10, Line 37 delete "further" and replace with --fourth--.

Column 10, Line 46 delete "=may" and replace with --may--.

Column 10, Line 52 delete "$\Delta_{calc2}(y,\beta) = B_{calc4}, \beta) - B_{calc2}(y,\beta)$" and replace with --$\Delta_{calc2}(y,\beta) = B_{calc4}(y,\beta) - B_{calc2}(y,\beta)$--.

Column 10, Line 55 delete "fields" and replace with --field--.

Column 10, Line 64 delete "$\Delta_{mes}$" and replace with --$\Delta_{mes1}$--.

Column 11, Line 3 delete "a how" and replace with --how--.

Column 11, Line 23 delete "f" and replace with --$f$--.

CERTIFICATE OF CORRECTION (continued)
U.S. Pat. No. 10,782,152 B2

Column 11, Line 46 delete "fields" and replace with --field--.

Column 11, Line 47 delete "fields" and replace with --field--.

Column 11, Line 50 delete "positions" and replace with --positions,--.

Column 11, Line 61 delete "measurement" and replace with --measurements--.

Column 12, Line 22 delete "measurement" and replace with --measurements--.

Column 12, Line 52 delete "an Y-axis" and replace with --a Y-axis--.

Column 12, Line 54 delete "an Z-axis" and replace with --a Z-axis--.

Column 13, Line 50 delete "of or more" and replace with --of one or more--.

Column 14, Line 2 delete "minimizes and" and replace with --minimizes an--.

Column 14, Line 7 delete "+/- 1 mm" and replace with --+/- 11 mm--.

Column 15, Line 17 delete "B16a" and replace with --316a--.

Column 15, Line 25 delete "of 702 FIG. 7" and replace with --of FIG. 7--.

Column 15, Line 42 delete "value," and replace with --value--.

Column 15, Line 60 delete "and" and replace with --an--.

Column 16, Line 1 delete "couple" and replace with --coupled--.

Column 16, Line 7 delete "B 316" and replace with --316--.

Column 16, Line 55 delete "of" and replace with --or--.

Column 16, Line 64 delete "variables" and replace with --variable--.

Column 16, Line 65 delete "measure" and replace with --measured--.

Column 16, Line 65 delete "variable" and replace with --variables--.

Column 16, Line 66 delete "404" and replace with --404,--.

Column 17, Line 3 delete "FIG. 3" and replace with --FIG. 3,--.

Column 17, Line 35 delete "embodiments" and replace with --embodiments,--.

CERTIFICATE OF CORRECTION (continued)
U.S. Pat. No. 10,782,152 B2

Column 17, Line 37 delete "values," and replace with --values--.

Column 17, Line 42 delete "in a" and replace with --a--.

Column 17, Line 45 delete "the block" and replace with --block--.

Column 17, Line 45 delete "can be" and replace with --that can be--.

Column 18, Line 21 delete "G:" and replace with --G.--.

Column 18, Line 52 delete "example:" and replace with --example,--.

Column 18, Line 59 delete "in a" and replace with --a--.

Column 18, Line 62 delete "the block" and replace with --block--.

Column 19, Line 19 delete "identified" and replace with --identified,--.

Column 19, Line 20 delete "example" and replace with --example,--.

Column 19, Line 29 delete "corresponding to" and replace with --corresponding--.

Column 20, Line 1 delete "if a" and replace with --if--.

Column 20, Line 4 delete "available" and replace with --available,--.

Column 20, Line 4 delete "proceed" and replace with --proceeds--.

Column 20, Line 15 delete "where an" and replace with --where--.

Column 20, Line 17 delete "FIG." and replace with --FIGS.--.

Column 20, Line 20 delete "avoid" and replace with --avoids--.

In the Claims

Column 20, Line 42 delete "comprises" and replace with --comprising--.

Column 20, Line 57 delete "value" and replace with --variable values--.

Column 21, Lines 1 and 2 delete "the minimal value of the distance function based on the calculated at least one difference" and replace with --a minimal value of the distance function--.

Column 21, Line 35 delete "values" and replace with --values; and--.

Column 22, Line 4 delete "the determining" and replace with --determining--.

Column 22, Line 9 delete "variables; and" and replace with --variables;--.

Column 22, Line 21 delete "measurement are" and replace with --measurements are--.

Column 22, Line 31 delete "time period time period" and replace with --time period--.